US011640162B2

(12) United States Patent
Benosman et al.

(10) Patent No.: US 11,640,162 B2
(45) Date of Patent: May 2, 2023

(54) APPARATUS AND METHOD FOR CONTROLLING A SYSTEM HAVING UNCERTAINTIES IN ITS DYNAMICS

(71) Applicant: Mitsubishi Electric Research Laboratories, Inc., Cambridge, MA (US)

(72) Inventors: Mouhacine Benosman, Boston, MA (US); Reazul Russel, Dover, NH (US); Jeroen van Baar, Arlington, MA (US)

(73) Assignee: Mitsubishi Electric Research Laboratories, Inc.

( * ) Notice: Subject to any disclaimer, the term of this patent is extended or adjusted under 35 U.S.C. 154(b) by 192 days.

(21) Appl. No.: 17/123,701

(22) Filed: Dec. 16, 2020

(65) Prior Publication Data

US 2022/0121188 A1 Apr. 21, 2022

Related U.S. Application Data

(60) Provisional application No. 63/093,385, filed on Oct. 19, 2020.

(51) Int. Cl.
*G05B 23/02* (2006.01)
*G05B 17/02* (2006.01)

(52) U.S. Cl.
CPC ........... *G05B 23/024* (2013.01); *G05B 17/02* (2013.01); *G05B 23/021* (2013.01); *G05B 23/0291* (2013.01)

(58) Field of Classification Search
CPC .............. G05B 23/024; G05B 23/021; G05B 23/0291; G05B 17/02
See application file for complete search history.

(56) References Cited

U.S. PATENT DOCUMENTS 11,327,449 B2* 5/2022 Quirynen ........... G05B 13/0275
2021/0178600 A1* 6/2021 Jha ............................ B25J 9/161

OTHER PUBLICATIONS

Reazul Hasan Russel et al., "Robust Constrained MDP's Soft Constrained Robust Policy Optimization under Model Uncertainty," ARXIV.org, Cornell University Library, Ithaca, NY 14851. Oct. 10, 2020.

(Continued)

*Primary Examiner* — Bryan Bui
(74) *Attorney, Agent, or Firm* — Gennadiy Vinokur

(57) ABSTRACT

A controller for controlling a system having uncertainties in its dynamics subject to constraints on an operation of the system is provided. The controller is configured to acquire historical data of the operation of the system, and determine, for the system in a current state, a current control action transitioning a state of the system from the current state to a next state. The current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system.

20 Claims, 17 Drawing Sheets

(56) References Cited

OTHER PUBLICATIONS

Sunha Saumya etal., "Policy Iteration for Robust Nonstationary Markov Decision Processes," Optimization Letters, SPringer Berlin Heidelberg. vol. 10, No. 8, May 18, 2016. pp. 1613-1628.

Yinlam Chow et al., "Lyapunov based Safe Policy Optimization for Continuous Control," Arxiv.org, Cornell University Library, Ithaca, NY 14853. Jan. 29, 2019.

Liyuan Zheng et al, "Constrined upper confidence reinforcement learning," Arxiv.org, Cornell University Library, Ithaca, NY 14853. Jan. 26, 2020.

* cited by examiner

Algorithm 1: Robust Safe Policy Iteration (RSPI) Algorithm

Input: A differentiable feasible policy $\pi_0$
Output: Optimal robust safe policy parameters $\pi^*$ 1 Initialize ambiguity set $\mathcal{P}$; safety threshold $d_0$;
2 for $k \leftarrow 0, 1, 2, \ldots$ do
3     For $\pi = \pi_k$ evaluate the robust Lyapunov function $L_{\tilde{t},k}$;
4     Evaluate the robust performance cost
$$\max_{p \in \mathcal{P}} \hat{\mathcal{C}}(\pi, \mathcal{P}) = \gamma_0^2 \mathbb{E} \left[ \sum_{t=0}^{\infty} \gamma^t c_{\max}(s_t, \pi(s_t)) \right]$$
$s.t. \; \max_{p \in \mathcal{P}} \hat{\mathcal{C}}(\pi, \mathcal{P})$
$c_{\max}, \; s.t. \; \max_{p \in \mathcal{P}} \hat{\mathcal{C}}(\pi, \mathcal{P}) = \gamma_0^2 \mathbb{E} \left[ \sum_{t=0}^{\infty} \gamma^t c_{\max}(s_t, \pi(s_t)) \right]$
5     Evaluate the robust cost value function $V_{\pi_k} = \max_{p \in \mathcal{P}} \hat{\mathcal{C}}(\pi_k, \mathcal{P})$;
6     Update the policy such that:
$$\pi_{k+1} = \operatorname{argmin}_{\pi \in \mathcal{F}_{L_{\tilde{t},k}}(s)} \mathcal{T}_{\pi, c_{\max}} [V_{\pi_k}](s), \; \forall s \in \Xi$$
7 return $\pi^*$;

FIG. 5B

Algorithm 2: Robust Safe Value Iteration (RSVI) Algorithm

Input: A differentiable feasible policy $\pi_0$
Output: Optimal robust safe policy parameters $\pi^*$ 1. Initialize ambiguity set $\mathcal{P}$; safety threshold $d_0$; Q-function $Q_0$;
   $$L_{f_0} = \tilde{\mathcal{D}}(\pi, \mathcal{P}, 0)$$
2. for $k \leftarrow 0, 1, 2, \ldots$ do
3.     For $\pi = \pi_k$ evaluate the robust Lyapunov function $L_{f_k}$;
4.     Evaluate the robust performance cost
   $$c_{max} = \text{s.t. } \max_{p \in \mathcal{P}} \tilde{\mathcal{C}}(\pi, \mathcal{P}) = \pi_k^T \mathbb{E}\left[\sum_{t=0}^{\infty} \gamma^t c_{max}(s_t, \pi(s_t))\right];$$
5.     Compute
   $$Q_{k+1} = c_{max}(s, a) + \sum_{s'} P(s'|s,a)(\min_{\pi \in \mathcal{F}_{L, f_k}}(s') \pi(\cdot|s')^T Q_k(s', \cdot));$$
6.     Compute policy $\pi_k = \operatorname{argmin}_{\pi \in \mathcal{F}_{L, f_k}}(s') \pi(\cdot|s')^T Q_k(s, \cdot);$
7.     Evaluate the robust Lyapunov function $L_{f_{k+1}}$ for policy $\pi = \pi_k$;
8. return $\pi^*$;

FIG. 5C

APPARATUS AND METHOD FOR CONTROLLING A SYSTEM HAVING UNCERTAINTIES IN ITS DYNAMICS

TECHNICAL FIELD

The present disclosure relates generally to controlling of a system and more particularly to an apparatus and method for controlling a system having uncertainties in its dynamics subject to constraints on an operation of the system.

BACKGROUND

In controlling of a system, a controller, which can be implemented using one or combination of software or hardware, generates control commands to the system. The control commands direct an operation of the system as desired, for instance, the operation follows a desired reference profile, or regulates outputs to a specific value. However, many real-world systems, such as autonomous vehicles and robotics, are required to satisfy constraints upon deployment to ensure safe operation. Further, the real-world systems are often subject to effects such as non-stationarity, wear-and-tear, uncalibrated sensors and the like. Such effects cause uncertainities in the system dynamics, and consequently makes a model of the system uncertain or unknown. Furthermore, uncertainties may exist in an environment, where the system is operating. Such uncertanties adversely affect the controlling of the system.

For instance, a robotic arm manipulating different objects with different shapes and masses, leads to difficulties in designing an optimal controller for the manipulation of all objects. Similarly, designing an optimal controller for a robotic arm manipulating a known object on different unknown surfaces, with different contact geometries, is difficult, due to intrinsic switching between contact dynamics. Accordingly, there is a need for a controller that can control a system having uncertainties of operation of the system.

SUMMARY

It is an object of some embodiments to control a system subject to constraints while having uncertainties of operation of the system. The uncertainty of the operation of the system may be due to uncertainty of dynamics of the system, which may be caused by uncertainty of values of parameters of the system, uncertainties of an environment where the system operates, or both. Therefore, the system may be alternatively referred to as 'uncertain system'. In some embodiments, a model of dynamics of the system includes at least one parameter of uncertainty. For example, a model of an arm of a robot system moving an object can include uncertainty of mass of the object carried by the arm. A model for movement of a train can include uncertainty about friction of train wheels with rails in current weather conditions.

Some embodiments are based on objective of adopting principles of Markov decision process (MDP) to control a constraint, but an uncertain system. In other words, some embodiments adopt MDP to control an uncertain system (system) subject to constraints. The MDP is a discrete-time stochastic control process that provides a framework for modeling decision-making in situations where outcomes are partly random and partly under control of a decision-maker. The MDP is advantageous as it builds on a formal framework guaranteeing optimality in terms of expected cumulated costs while accounting for uncertain action outcomes.

Further, some embodiments are based on understanding that the MDP is advantageous for a number of different control situations including robotics, and automatic control. To that end, it is an object of some embodiments to extend the MDP to control the system subject to the constraints and uncertainties.

Some embodiments are based on a recognition that the MDP can be extended to cover the uncertainty of the operation of the system in the context of robust MDP (RMDP). While the MDP aims to estimate a control action optimizing a cost (referred herein as a performance cost), the RMDP aims to optimize the performance cost for different instances of the dynamics of the system within bounds of the uncertainty of the operation of the system. For example, while an actual mass of the object carried by the arm of the robot system may be unknown, a range of possible values can be known in advance defining the bounds of the uncertainty on operation of the robot system. The system may have one or multiple uncertain parameters.

In a number of situations, the RDMP optimizes the performance cost for worst possible conditions justified by the uncertainty of the operation of the system. However, the RMDP is not suitable for constraint systems, because the optimization of the performance cost for the worst possible conditions can violate imposed constraints, which are outside of the optimized performance cost.

Some embodiments are based on a recognition that MDP can be extended for dealing with the constraints of the operation of the system in context of a constraint MDP (CMDP). The CMDP is designed to determine policies for sequential stochastic decision problems where multiple costs are concurrently considered. The consideration of multiple costs allows including the constraints with the MDP. For example, one optimized cost can be a performance cost, as explained above, while another cost can be a safety cost that governs satisfaction of the constraints.

To that end, it is an object of some embodiments to combine the RMDP and the CMDP into a common framework of robust and constraint MDP (RCMDP). However, producing the common framework, i.e., the RCMDP by combing the RMDP and the CMDP is challenging as some principles of the MDP are common for both the RMDP and the CMDP, but some other principles are different and difficult to reconcile. For example, although RMDPs and CMDPs share many traits in their definitions, some differences may emerge when computing optimal policies. The optimal policy for the CMDP is in general a stochastic policy, for an assumed model of the system with no uncertainties. Hence, there is a need to consider the uncertainties of the dynamics of the system in a stochastic policy formulation of the CMDP in a manner suitable for RMDP.

Some embodiments are based on the realization that the uncertainties of the dynamics of the system can be reformulated as uncertainties on state transitions of the system. In MDP, a probability that a process moves into its next state s' is influenced by a chosen action. Specifically, it is given by a state transition function $P_a(s, s')$. Thus, the next state s' depends on a current state s and a decision maker's action a. But the current state s and the decision maker's action a, it is conditionally independent of previous states and actions. In other words, the state transitions of the MDP satisfy Markov property.

Some embodiments represent the uncertainties of the dynamics of the system as transition probability $p^*_{s,a} \in \Delta^S$. For example, the uncertainties of the dynamics of the system can be represented as an ambiguity set $\mathcal{P}_{s,a}$, which is a set of feasible transition matrices defined for each state $s \in$ $\mathcal{S}$ and action $a \in \mathcal{A}$, i.e., a set of all possible uncertain models of the system. Hereinafter, $\mathcal{P}$, is used to refer cumulatively to $\mathcal{P}_{s,a}$ for all states s and actions a.

The performance cost and the safety cost are modified with the ambiguity set, respectively. In particular, the ambiguity set is incorporated in the performance cost to produce a robust performance cost, and the safety cost to produce a robust safety cost, respectively. Therefore, solving (or formulating) the RCMDP implies optimization of the performance cost, over set of all possible uncertain models of the system (the ambiguity set), subject to the safety cost which also needs to be satisfied over the set of all possible uncertain models of the system. In other words, such a modification with the ambiguity set allows the RMDP to consider the uncertainties of the dynamics of the system in the performance cost estimation, and allows the CMDP to consider the uncertainties of the dynamics of the system in constraint enforcement, i.e., in the safety cost, in a manner consistent with the performance cost estimation.

Hence, the reformulation of the uncertainties of the dynamics of the system as the uncertainties on the state transitions of the system allows unifying optimization of both the performance cost and the safety cost in a single consistent formulation (i.e., RCMDP). In addition, such a reformulation is advantageous because real or true state transition, while unknown, is common to both the performance cost and the safety cost, and such formulation enforces this consistency. To that end, the RCMDP formulation includes the ambiguity set to optimize the performance cost subject to an optimization of the safety cost enforcing the constraints on the operation of the system.

Hence, some embodiments use a joint multifunction optimization of both the performance cost and the safety cost, wherein a state transition for each of state and action pairs in the performance cost and the safety cost is represented by a plurality of state transitions capturing the uncertainties of the operation of the system. Such a joint optimization introduces interdependency on both the performance cost and the safety cost.

In addition, some embodiments perform an imbalance joint multifunction optimization in which the optimization of the performance cost is a primary objective, while optimization of the safety cost is a secondary one. Indeed, the satisfaction of the constraint is not useful if the task is not performed. Hence, some embodiments define the optimization of the safety cost as a constraint on the optimization of the performance cost. In such a manner, the optimization of the safety cost becomes subordinate to the optimization of the performance cost, because the safety cost acting as the constraint does not have an independent optimization objective, and only limiting the actions the system takes to perform a task.

Some embodiments are based on a realization that the optimization of the performance cost can benefit from principles of a minimax optimization, while the optimization of the safety cost can remain to be generic. The minimax is a decision rule for minimizing possible loss for a worst-case (maximum loss) scenario. In the context of the RCMDP, the minimax optimization aims to optimize the performance cost for the worst-case scenario of values of the uncertain parameters of the dynamics of the system. Because the plurality of state transitions capturing the uncertainties of the operation of the system is included in both the performance and the safety costs, the actions determined by primary minimax optimization of the performance cost for the worst-case values of the uncertain parameters that satisfy the constraints for the same worst-case values of the uncertain parameters in the subordinate optimization of safety cost can also satisfy the constraints when real and true values of the uncertain parameters are more advantageous for safe task performance.

In other words, if a computed control policy or control actions minimize the performance cost corresponding to the worst possible max cost of the set of possible uncertain models of the system, then it is minimizing the performance cost over any model of the system within the set of possible uncertain models of the system. Similarly, if the computed control policy satisfies that the safety cost the safety constraint bound for the worst possible safety cumulative max cost of the set of possible uncertain models of the system, then it is minimizing the safety cost over any model of the system within the set of possible uncertain models of the system.

Some embodiments are based on a realization that the constraints on the operations of the system can be enforced as hard constraints prohibiting their violation or as soft constraints discouraging their violation. Some embodiments are based on understanding that optimization of the safety cost may act as a soft constraint, which is acceptable for some control applications but prohibitive in others. To that end, for some control applications, there is a need to enforce a hard constraint on the operation of the system. In such situations, some embodiments enforce the hard constraint on the optimization of the safety cost as contrasted with enforcing the constraints on the optimization of the performance cost.

The constraints are designed on the performance of a task by the operation of the system. Thus, the constraint should be enforced on the optimization of the performance cost. Such enforcement may contradict principles of the RMDP, because the variables optimized by the optimization of the performance cost are independent of the constraints. In contrast, the optimization of the safety cost optimizes variable or variables dependent on the constraints. Therefore, the hard constraint is easier to enforce on the variables dependent on the constraints.

To that end, in the RCMDP, the optimization of the performance cost is the minimax optimization that optimizes the performance cost for the worst-case scenario of values of the uncertain parameters causing the uncertainties of the dynamics of the system, and the optimization of the safety cost optimizes an optimization variable subject to the hard constraint.

Some embodiments are based on a recognition that while the RCMDP is valuable in numerous robotic applications. However, practical application of the RCMDP is still challenging due to its computational complexity. Because in many practical applications, the control policy computation of the RCMDP requires a solution of constrained linear programs with a large number of variables.

Some embodiments are based on recognition that the RCMDP solution can be simplified by taking advantage of Lyapunov theory to present a Lyapunov function and show it decreases. Such an approach is referred to herein as a Lyapunov descent. The Lyapunov descent is advantageous because it allows controlling the system iteratively while optimizing the control policy for controlling the system. In other words, the Lyapunov descent allows the replacement of determining the optimal and safe control action before initiating the control, with controlling the system with sub-optimal but safe control actions that eventually, i.e., iteratively, may converge to the optimal control. Such a replacement is possible due to the invariance sets generated by the Lyapunov descent. To that end, the performance cost and the safety cost are optimized using the Lyapunov decent.

Some embodiments are based on recognition that designing a Lyapunov function and making it explicit greatly simplifies, clarifies, and to a certain extent, unifies, convergence theory for optimization. However, designing a Lyapunov function for such a constrained environment of the RCMDP is challenging. To that end, some embodiments design a Lyapunov function based on an auxiliary cost function computed such that to enforce that safety constraint defined by the safety cost is satisfied at the current state while reducing Lyapunov dynamics over subsequent states transitions. Such an auxiliary cost function explicitly and constructively introduces a Lyapunov argument into the RCMDP framework without a need to solve for the constrained control of the uncertain system in its entirety.

Accordingly, some embodiments annotate the safety cost with an auxiliary cost function configured to enforce that the constraints are satisfied at the current state, which together with the decrease of the Lyapunov dynamics via Bellman operator over subsequent states evolution which enforced by a sub-optimal control policy, leads to satisfaction of the safety constraint over all states evolution for each sub-optimal control policy. The iteration of this process of computing the auxiliary cost function and the associated sub-optimal control policy leads eventually to an optimal control policy while satisfying the constraints.

According to an embodiment, the auxiliary cost function is a solution of a robust linear programming optimization problem that maximizes a value of the auxiliary cost function that maintains satisfaction of the safety constraints for all possible states of the system with the uncertainties of the dynamics. According to an alternate embodiment, the auxiliary cost function is a weighted combination of basis functions with weights determined by the solution of the robust linear programming optimization problem. In some embodiments, the auxiliary cost function is a weighted combination of basis functions defining a deep neural network, with weights of the neural networks determined by the solution of the robust linear programming optimization problem.

Accordingly one embodiment discloses a controller for controlling a system having uncertainties in its dynamics subject to constraints on an operation of the system, comprising: at least one processor; and memory having instructions stored thereon that, when executed by the at least one processor, cause the controller to: acquire historical data of the operation of the system including pairs of control actions and state transitions of the system controlled according to corresponding control actions; determine, for the system in a current state, a current control action transitioning a state of the system from the current state to a next state, wherein the current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system; and control the operation of the system according to the current control action to change the state of the system from the current state to the next state.

Accordingly, another embodiment discloses a method for controlling a system having uncertainties in its dynamics subject to constraints on an operation of the system. The method comprises: acquiring historical data of the operation of the system including pairs of control actions and state transitions of the system controlled according to corresponding control actions; determining, for the system in a current state, a current control action transitioning a state of the system from the current state to a next state, wherein the current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system; and controlling the operation of the system according to the current control action to change the state of the system from the current state to the next state.

BRIEF DESCRIPTION OF THE DRAWINGS

FIG. 5B shows a robust safe policy iteration (RSPI) algorithm for determining an optimal control policy within a set of robust Lyapunov-induced Markov stationary policies, according to some embodiments.

FIG. 5C shows a robust safe value iteration (RSVI) algorithm for determining the optimal control policy within the set of robust Lyapunov-induced Markov stationary policies, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
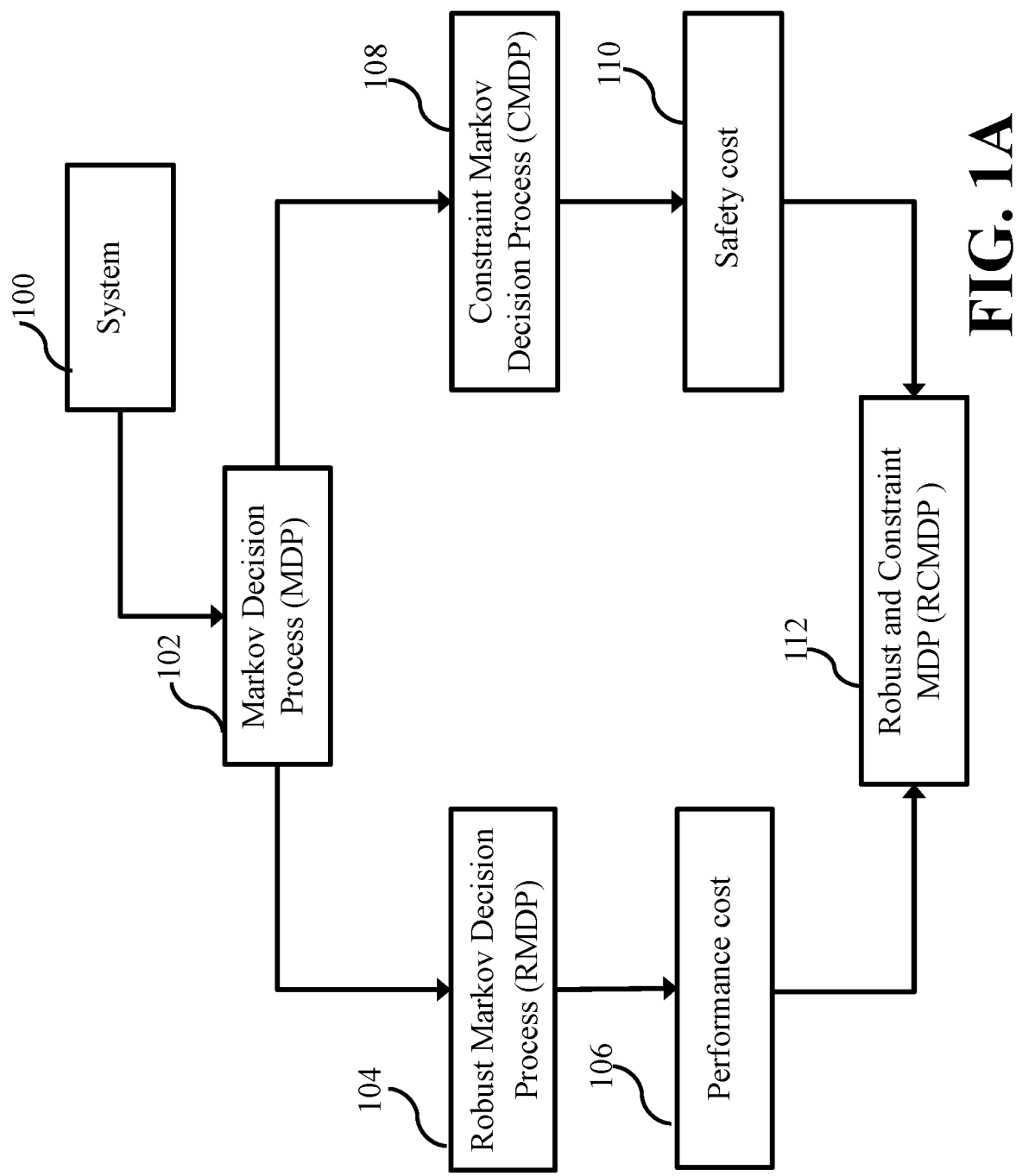
FIG. 1A shows a schematic for formulation of a robust and constraint Markov decision process (RCMDP), according to some embodiments.

FIG. 1A shows a schematic for formulation of a robust and constraint Markov decision process (RCMDP), according to some embodiments. It is an object of some embodiments to control a system 100 subject to constraints while having uncertainties of operation of the system. The uncertainty of the operation of the system 100 may be due to uncertainty of dynamics of the system 100, which may be caused by uncertainty of values of parameters of the system 100, uncertainties of an environment where the system operates 100, or both. Therefore, the system 100 may be alternatively referred to as 'uncertain system'. In some embodiments, a model of dynamics of the system 100 includes at least one parameter of uncertainty. For example, a model of an arm of a robot system moving an object can include uncertainty of mass of the object carried by the arm. A model for movement of a train can include uncertainty about friction of train wheels with rails in current weather conditions.

Some embodiments are based on objective of adopting principles of Markov decision process (MDP) 102 to control a constraint, but an uncertain system. In other words, some embodiments adopt MDP 102 to control an uncertain system (system 100) subject to constraints. The MDP 102 is a discrete-time stochastic control process that provides a framework for modeling decision-making in situations where outcomes are partly random and partly under control of a decision-maker. The MDP is advantageous as it builds on a formal framework guaranteeing optimality in terms of expected cumulated costs while accounting for uncertain action outcomes. Further, some embodiments are based on understanding that the MDP 102 is advantageous for a number of different control situations including robotics, and automatic control. To that end, it is an object of some embodiments to extend the MDP 102 to control the system 100 subject to the constraints.

Some embodiments are based on a recognition that the MDP 102 can be extended to cover the uncertainty of the operation of the system 100 in the context of robust MDP (RMDP) 104. While the MDP 102 aims to estimate a control action optimizing a cost 106 (referred herein as a performance cost), the RMDP 104 aims to optimize the performance cost 106 for different instances of the dynamics of the system 100 within bounds of the uncertainty of the operation of the system 100. For example, while an actual mass of the object carried by the arm of the robot system may be unknown, a range of possible values can be known in advance defining the bounds of the uncertainty on operation of the robot system. The system 100 may have one or multiple uncertain parameters.

In a number of situations, the RDMP 104 optimizes the performance cost 106 for worst possible conditions justified by the uncertainty of the operation of the system 100. However, the RMDP 104 is not suitable for constraint systems, because the optimization of the performance cost 106 for the worst possible conditions can violate imposed constraints, which are outside of the optimized performance cost.

Some embodiments are based on a recognition that MDP 102 can be extended for dealing with the constraints of the operation of the system 100 in context of a constraint MDP (CMDP) 108. The CMDP 108 is designed to determine policies for sequential stochastic decision problems where multiple costs are concurrently considered. The consideration of multiple costs allows including the constraints with the MDP 102. For example, one optimized cost can be a performance cost 106, as explained above, while another cost can be a safety cost 110 that governs satisfaction of the constraints.

To that end, it is an object of some embodiments to combine the RMDP 104 and the CMDP 108 into a common framework of robust and constraint MDP (RCMDP) 112. However, producing the common framework (i.e., the RCMDP 112 by combing the RMDP 104 and the CMDP 108) is challenging as many principles of the MDP 102 are common for both the RMDP 104 and the CMDP 108, but many other principles are different and difficult to reconcile. For example, although RMDPs and CMDPs share many traits in their definitions, some differences may emerge when computing optimal policies. The optimal policy for the CMDP 108 is in general a stochastic policy, for an assumed model of the system 100 with no uncertainties. Hence, there is a need to consider the uncertainties of the dynamics of the system 100 in a stochastic policy formulation of the CMDP 108 in a manner suitable for RMDP.

Figure 1B:
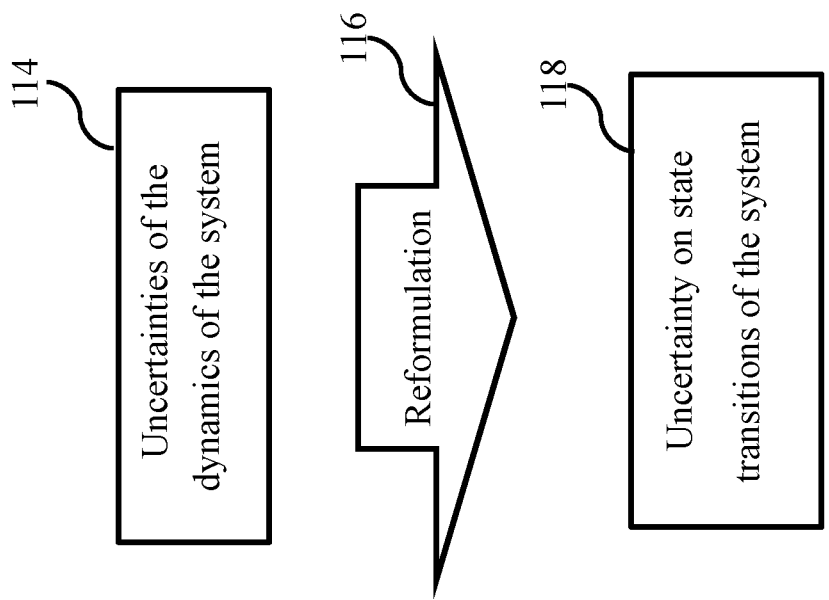
FIG. 1B shows a schematic of principles for considering uncertainties of the dynamics of a system in robust Markov decision process (RMDP) and constraint Markov decision process (CMDP), in consistent with principles of the Markov decision process (MDP), according to some embodiments.

FIG. 1B shows a schematic of principles for considering the uncertainties 114 of the dynamics of the system 100 in the RMDP 104 and the CMDP 108, in consistent with principles of the MDP, according to some embodiments. Some embodiments are based on the realization that the uncertainties 114 of the dynamics of the system 100 can be reformulated 116 as uncertainties on state transitions 118 of the system 100. In MDP, a probability that a process moves into its next state s' is influenced by a chosen action. Specifically, it is given by a state transition function $P_a(s, s')$. Thus, the next state's' depends on a current state s and a decision maker's action a. But the current state s and the decision maker's action a, it is conditionally independent of previous states and actions. In other words, the state transitions of the MDP 102 satisfy Markov property.

Some embodiments represent the uncertainties 114 of the dynamics of the system 100 as transition probability $p^*_{s,a} \in \Delta^S$. For example, the uncertainties 114 of the dynamics of the system 100 can be represented as an ambiguity set $\mathcal{P}_{s,a}$, which is a set of feasible transition matrices defined for each state s∈$S$ and action a∈$\mathcal{A}$, i.e., a set of all possible uncertain models of the system 100. Hereinafter, $\mathcal{P}$ is used to refer cumulatively to $\mathcal{P}_{s,a}$ for all states s and actions a.

Figure 1C:
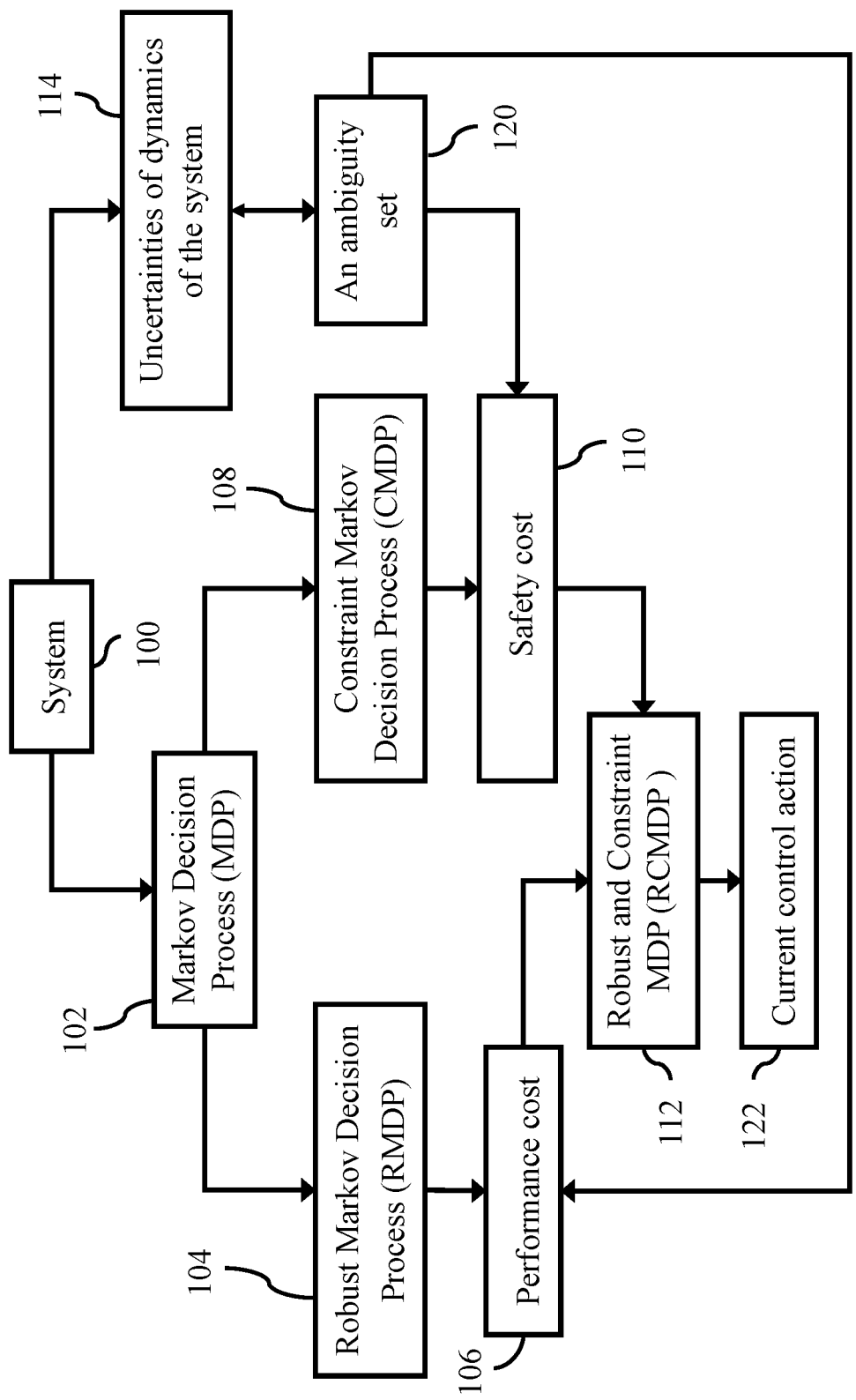
FIG. 1C shows a schematic for formulation of the RCMDP including an ambiguity set, according to some embodiments.

FIG. 1C shows a schematic for formulation of the RCMDP 112 including the ambiguity set $\mathcal{P}$ 120, according to some embodiments. The performance cost 106 and the safety cost 110 are modified with the ambiguity set 120, respectively. In particular, the ambiguity set 120 is incorporated in the performance cost 106 to produce a robust performance cost, and the safety cost 110 to produce a robust safety cost, respectively. Therefore, solving (or formulating) the RCMDP 112 implies optimization of the performance cost 106, over set of all possible uncertain models of the system 100 (the ambiguity set 120), subject to the safety cost 110 which also needs to be satisfied over the set of all possible uncertain models of the system 100. In other words, such a modification with the ambiguity set 120 allows the RMDP 104 to consider the uncertainties 114 of the dynamics of the system 100 in the performance cost estimation, and allows the CMDP 108 to consider the uncertainties 114 of the dynamics of the system 100 in constraint enforcement, i.e., in the safety cost 110, in a manner consistent with the performance cost estimation.

Hence, the reformulation 116 of the uncertainties 114 of the dynamics of the system 100 as the uncertainties on the state transitions of the system 100 allows unifying optimization of both the performance cost 106 and the safety cost 110 in a single consistent formulation (i.e., RCMDP). In addition, such a reformulation 116 is advantageous because real or true state transition, while unknown, is common to both the performance cost 106 and the safety cost 110, and such formulation enforces this consistency. To that end, the RCMDP 112 formulation includes the ambiguity set 120 to optimize the performance cost 106 subject to an optimization of the safety cost 110 enforcing the constraints on the operation of the system 100.

Hence, some embodiments use a joint multifunction optimization of both the performance cost 106 and the safety cost 110, wherein a state transition for each of state and action pairs in the performance cost 106 and the safety cost 110 is represented by a plurality of state transitions capturing the uncertainties of the operation of the system 100. Such a joint optimization introduces interdependency on both the performance cost 106 and the safety cost 110.

In addition, some embodiments perform an imbalance joint multifunction optimization in which the optimization of the performance cost 106 is a primary objective, while optimization of the safety cost 110 is a secondary one. Indeed, the satisfaction of the constraint is not useful if the task is not performed. Hence, some embodiments define the optimization of the safety cost 110 as a constraint on the optimization of the performance cost 110. In such a manner, the optimization of the safety cost becomes subordinate to the optimization of the performance cost, because the safety cost acting as the constraint does not have an independent optimization objective, and only limiting the actions the system 100 takes to perform a task.

Further, some embodiments determine a current control action 122 for the system 100, according to the RCMDP 112. In particular, the RCMDP 112 optimizes the performance cost 106 subject to the optimization of the safety cost 110 enforcing the constraints on the operation of the system 100, to determine the current control action 122.

Figure 2:
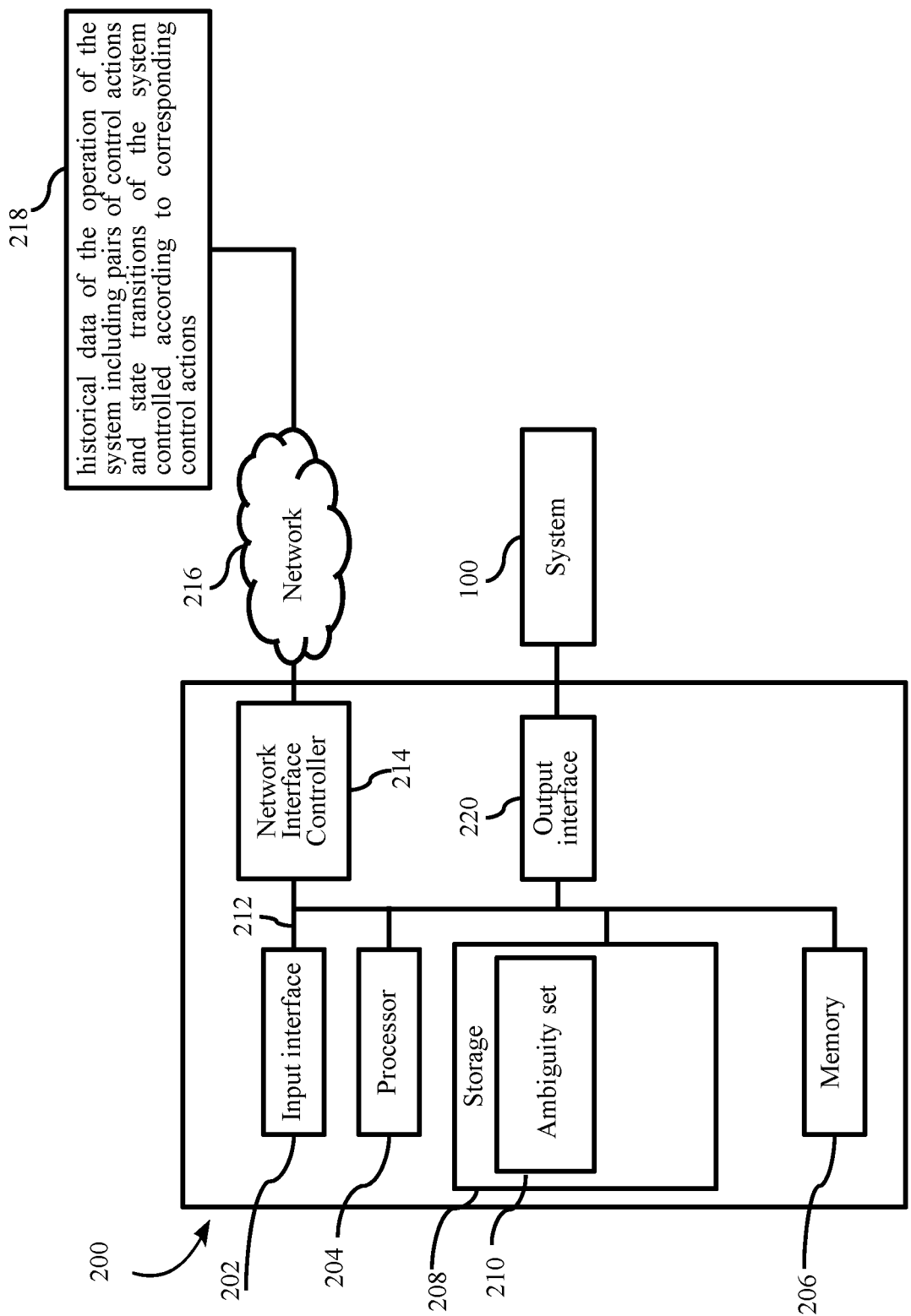
FIG. 2 shows a block diagram of a controller for controlling a system having uncertainties in its dynamics subject to constraints on an operation of the system, according to some embodiments.

FIG. 2 shows a block diagram of a controller 200 for controlling the system 100 having uncertainties in its dynamics subject to the constraints on the operation of the system 100, according to some embodiments. The controller 200 is connected to the system 100. The system 100 may be a robot system, an autonomous vehicle system, a heating, ventilating, and air-conditioning (HVAC) system, or the like. The controller 200 is configured to acquire historical data of the operation of the system 100 including pairs of control actions and state transitions of the system 100 controlled according to corresponding control actions, via the input interface 202.

The controller 200 can have a number of interfaces connecting the controller 200 with other systems and devices. For example, a network interface controller (NIC) 214 is adapted to connect the controller 200, through a bus 212, to a network 216. Through the network 216, either wirelessly or through wires, the controller 200 acquires historical data 218 of the operation of the system 100 including the pairs of control actions or state transitions of the system 100 controlled according to corresponding control actions.

The controller 200 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices. Further the controller 200 includes a storage device 208 adapted to store different modules storing executable instructions for the processor 204. The storage device 208 can be implemented using a hard drive, an optical drive, a thumb drive, an array of drives, or any combinations thereof. The storage device 208 is configured to store an ambiguity set 210 for the RCMDP formulation. The ambiguity set 210 includes the set of all possible uncertain models of the system 100.

In some embodiments, the controller 200 is configured to determine, for the system 100 in a current state, a current control action transitioning a state of the system 100 from the current state to a next state, wherein the current control action is determined according to RCMDP that uses the historical data to optimize a performance cost of the operation of the system subject to an optimization of a safety cost enforcing the constraints on the operation. A state transition for each of state and action pairs in the performance cost and the safety cost is represented by a plurality of state transitions capturing the uncertainties of the dynamics of the system 100. The controller 200 is further configured to control the operation of the system 100 according to the current control action to change the state of the system 100 from the current state to the next state.

Additionally, the controller 200 may include an output interface 220. In some embodiments, the controller 200 is further configured to submit, via the output interface 220, to a controller of the system 100 to operate the system 100 according to the current control action.

Mathematical Formulation of RCMDP

A RMDP model with a finite number of states $S = \{1, \ldots, S\}$ and finite number of actions $\mathcal{A} = \{1, \ldots, A\}$ is considered. Every action a∈$\mathcal{A}$ is available for the decision maker to take in every state s∈$S$. After taking an action a∈A in state s E S, the decision maker receives a cost c(s,a)∈R and transitions to a next state s' according to the true but unknown transition probability $p^*_{s,a} \in \Delta^S$. An ambiguity set $\mathcal{P}_{s,a}$ is the set of feasible transition matrices defined for each state $s \in \mathcal{S}$ and action $a \in \mathcal{A}$, i.e., the set of all possible uncertain models of the system 100. $\mathcal{P}$ is used to refer cumulatively to $\mathcal{P}_{s,a}$ for all states s and actions a.

Figure 3:
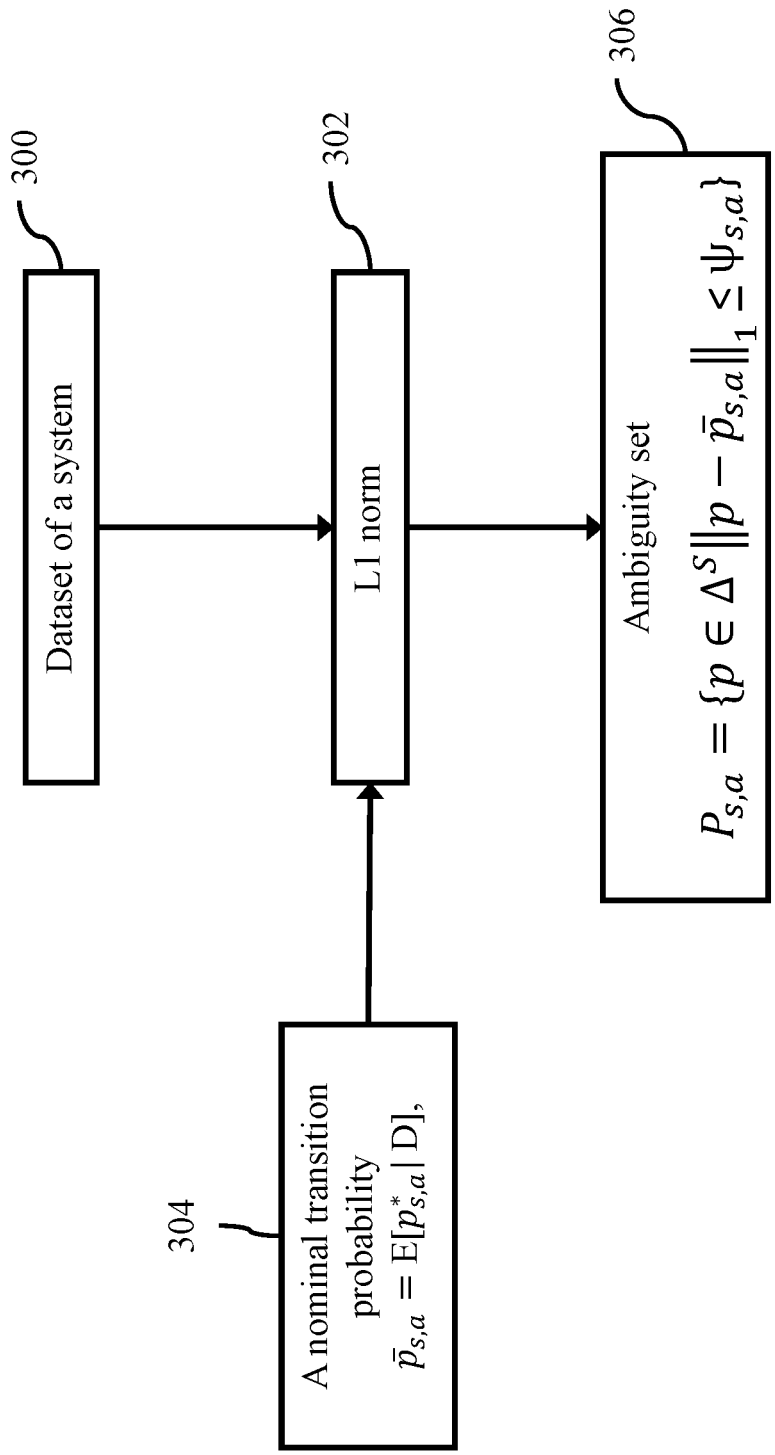
FIG. 3 shows a schematic for designing of the ambuguity set, according to some embodiments.

FIG. 3 shows a schematic for designing of the ambuguity set, according to some embodiments. In an embodiment, s, a-rectangular ambiguity sets are used, which assumes independence between different state-action pairs. The ambuguity set is determined using dataset D 300 of operation of a system (e.g., system 100). The dataset D 300 may include pairs of control actions and state transitions of the system. Further, the controller 200 computes a mean of the dataset $\mathcal{D}$ and defines the ambiguity set 306 around the mean using $L_1$-norm 302. Specifically, the ambiguity set 306 is defined using the $L_1$-norm bounded ambiguity sets around a nominal transition probability $\bar{p}_{s,a} = \mathbb{E}\,[p^*_{s,a}|\mathcal{D}]$ 304, on the dataset 300, as:

$$\mathcal{P}_{s,a} = \{p \in \Delta^S \| p - \bar{p}_{s,a}\|_1 \le \psi_{s,a}\}$$

where $\psi_{s,a} \ge 0$ is a budget of allowed deviations. Such budget can be computed using Hoeffding bound as:

$$\psi_{s,a} = \sqrt{\frac{2}{n_{s,a}} \log \frac{SA2^S}{\delta}},$$

where $n_{s,a}$ is a number of transitions in the dataset $\mathcal{D}$ originating from state s and an action a, and $\delta$ is a confidence level.

In different embodiments, different norms are used to design the ambiguity set 306. For example, one embodiment may use $L_2$ norm. In another embodiment, $L_0$ norm may be used to design the ambiguity set 306. In some other embodiments, $L_\infty$ norm may be used to design the ambiguity set 306.

Alternatively, in some embodiments, the ambiguity set 306 can be defined using data-driven and confidence regions. In anther alternate embodiment, the ambiguity set 306 can be defined using likelihood levels of probability distribution of the dataset.

A stationary randomized policy $\pi(\cdot|s)$ for state $s \in \mathcal{S}$ defines a probability distribution over actions $a \in \mathcal{A}$ and H is a set of stationary randomized policies. A robust return $g^\theta$ for a robust policy $\theta$, a sampled trajectory $\xi$ and the ambiguity set 306 ($\mathcal{P}$) is defined as:

$$g^\theta(\xi_t) = \Sigma_{t=0}^\infty \gamma^t c(s_t, \pi(s_t)),$$

where $\xi = [s_0, a_0, \dots ]$. The expected values of random variables $g^\theta(\xi_t)$ when $\xi$ starts from a specific state s is defined as robust value function of that state: $v^\theta(s) = E[g^\theta(\xi_t)]$.

Further, to accommodate for a safety constraint, the CMDP is used. Here, the RMDP model is extended by introducing an additional immediate safety constraint cost $d(s) \in [0, D_{max}]$ and an associated constraint budget $d_0 \in R_+$, or safety bound, as an upper-bound on expected cumulative constraint costs. A total robust constraint return $h^\theta$ for a policy $\theta$, a sampled trajectory $\xi$ and ambiguity set $\mathcal{P}$ is defined as:

$$h^\theta(\xi_t) = \Sigma_{t=0}^\infty \gamma^t d(s_t, \pi(s_t))$$

The expected values of random variables $h^\theta(\xi_t)$ when $\xi$ starts from a specific state s is defined as the constraint value function of that state: $\hat{u}^\theta(s) = E[h^\theta(\xi_t)]$.

Therefore, for an initial state distribution $p_0 \in \Delta^s$, the robust return $\hat{C}$ in terms of value function, i.e., the robust performance cost, is defined as: $\hat{C}(\pi, \mathcal{P}) = p_0^T \hat{v}_p^\pi$, and the robust return for constraint cost, i.e., robust safety cost, is defined as: $\hat{D}(\pi, \mathcal{P}) = p_0^T \hat{u}_p^\pi$.

Some embodiments are based on a realization that the optimization of the performance cost can benefit from principles of a minimax optimization, while the optimization of the safety cost can remain to be generic. The minimax is a decision rule for minimizing possible loss for a worst-case (maximum loss) scenario. In the context of the RCMDP, the minimax optimization aims to optimize the performance cost for the worst-case scenario of values of uncertain parameters of the dynamics of the system 100. Because the plurality of state transitions capturing the uncertainties of the operation of the system 100 is included in both the performance and the safety costs, the actions determined by primary minimax optimization of the performance cost for the worst-case values of the uncertain parameters that satisfy the constraints for the same worst-case values of the uncertain parameters in the subordinate optimization of the safety cost can also satisfy the constraints when the real and true values of the uncertain parameters are more advantageous for safe task performance.

Therefore, some embodiments formulate the following RCMDP problem:

$$\min_{\pi \in \pi} \max_{p \in P} \hat{C}(\pi, P) \qquad (1)$$

$$\text{s.t. } \max_{p \in P} \hat{D}(\pi, \mathcal{P}) \le d_0$$

In other words, some embodiments aim at solving the RCMDP problem (1), i.e., optimizing the performance cost, over the set of all possible uncertain models of the system 100, under a safety constraint 206, which also needs to be satisfied over the set of all possible uncertain models of the system 100. According to an embodiment, to ensure that a control policy or a control action that is being computed achieves this is by working on worst performance cost and safety cost over the set of all possible uncertain models of the system 100. If the computed control policy minimizes the performance cost $\hat{C}$ corresponding to a worst possible cost $\max_{p \in P} \hat{C}$ of the set of possible unceratin models of the system 100, then it is minimizing the performance cost over any model of the system 100 within the set of possible uncertain models of the system 100. Similarly, if the computed control policy satisfies that the safety cost $\hat{D}$ of the safety constraint bound $d_0$ for a worst possible safety cost $\max_{p \in P} \hat{D}$ of the set of possible uncertain models of the system 100, then it is minimizing the safety cost over any model of the system 100 within the set of possible uncertain models of the system 100.

Some embodiments are based on a realization that the constraints on the operations of the system 100 can be enforced as hard constraints prohibiting their violation or as soft constraints discouraging their violation. Some embodiments are based on understanding that optimization of the safety cost may act as a soft constraint, which is acceptable for some control applications but prohibitive in others. To that end, for some control applications, there is a need to enforce a hard constraint on the operation of the system 100. In such situations, some embodiments enforce the hard constraint on the optimization of the safety cost as contrasted with enforcing the constraints on the optimization of the performance cost.

The constraints are designed on the performance of a task by the operation of the system 100. Thus, the constraint should be enforced on the optimization of the performance cost. Such enforcement may contradict principles of the RMDP, because the variables optimized by the optimization of the performance cost are independent of the constraints. In contrast, the optimization of the safety cost optimizes variable or variables dependent on the constraints. Therefore, the hard constraint is easier to enforce on the variables dependent on the constraints.

To that end, in the RCMDP problem (1), the optimization of the performance cost C is the minimax optimization that optimizes the performance cost for the worst-case scenario of values of the uncertain parameters causing the uncertainties of the dynamics of the system 100, and the optimization of the safety cost D optimizes an optimization variable subject to the hard constraint.

Some embodiments are based on a recognition that while the RCMDP equation (1) is valuable in numerous robotic applications. However, its practical application is still challenging due to its computational complexity. Because in many practical applications, the control policy computation of the RCMDP requires a solution of constrained linear programs with a large number of variables.

Figure 4:
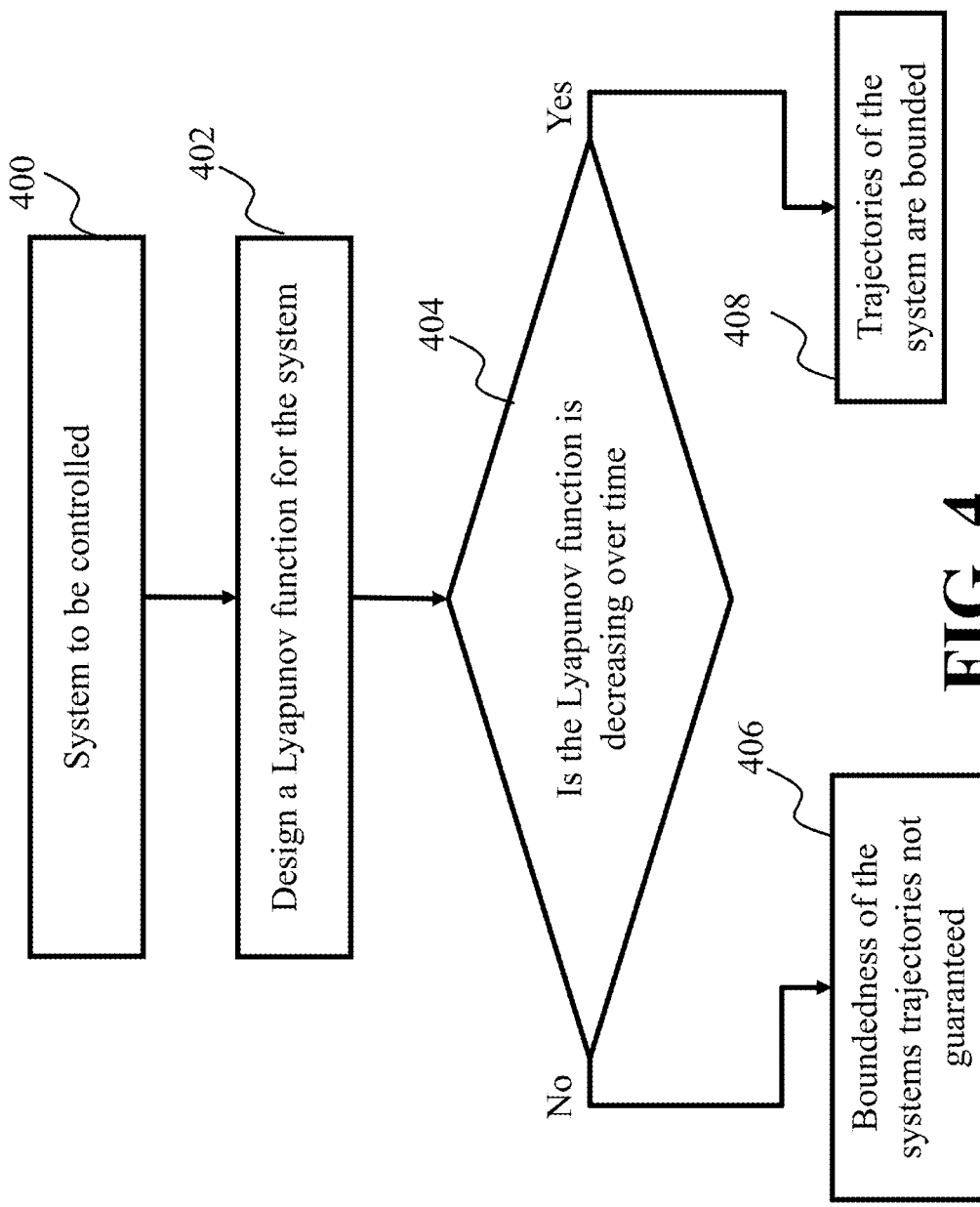
FIG. 4 shows a schematic of principles of a Lyapunov function, according to some embodiments.

Some embodiments are based on recognition that the RCMDP solution can be simplified by using Lyapunov theory to present a Lyapunov function. FIG. 4 shows a schematic of principles of the Lyapunov function, according to some embodiments. For a system (e.g., system 100) to be controlled 400, the Lyapunov theory allows to design a Lyapunov function 402 for the system. In particular, the Lyapunov theory allows to design a positive definite function, e.g., an energy function of the system. Further, it is checked if the Lyapunov function is decreasing over time 404, for example, by testing time derivative of the Lyapunov function. If the Lyapunov function is decreasing over time, then it can be inferred that the trajectories of the system are bounded 408. If the Lyapunov function is not decreasing, then it is inferred that boundedness of the systems trajectories is not guaranteed 406. Therefore, some embodiments simplify the RCMDP by taking advantage of the Lyapunov theory to present the Lyapunov function and show it decreases. Such an approach is referred to as a Lyapunov descent.

Additionally, the Lyapunov descent is advantageous because it allows controlling the system iteratively while optimizing the control policy for controlling the system. In other words, the Lyapunov descent allows a replacement of determining an optimal and safe control action before initiating the control, with controlling the system with suboptimal but safe control actions that eventually, i.e., iteratively, may converge to the optimal control. Such a replacement is possible due to invariance sets generated by the Lyapunov descent. To that end, the performance cost and the safety cost are optimized using the Lyapunov decent.

Figure 5A:
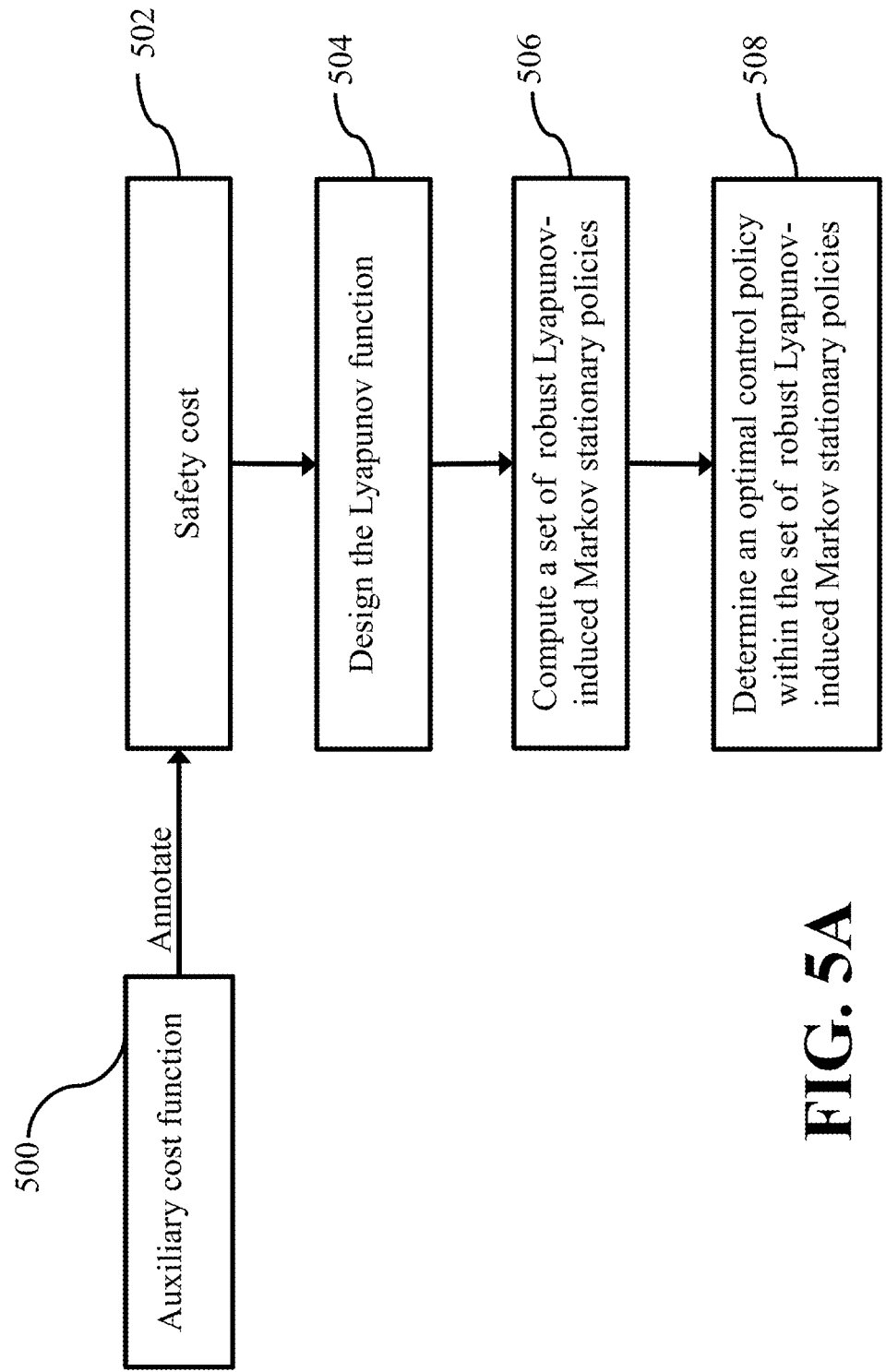
FIG. 5A shows a schematic of Lyapunov descent based solution for the RCMDP to determine an optimal control policy, according to some embodiments.

FIG. 5A shows a schematic of Lyapunov descent based solution for the RCMDP problem (1) to determine an optimal control policy, according to some embodiments. Some embodiments are based on a recognition that designing and using a Lyapunov function simplifies and unifies convergence theory for optimization. However, designing the Lyapunov function for a constrained environment of the RCMDP is challenging.

To that end, some embodiments design a Lyapunov function 504 based on an auxiliary cost function 500. The auxiliary cost function 500 is configured to enforce that the constraints defined by the safety cost 502 is satisfied at the current state while reducing the Lyapunov function along the dynamics of the system 100 over subsequent evolution of the state transitions evolution. Therefore, the safety cost 502 is annotated with the auxiliary cost function 500. The auxiliary cost function 500 explicitly and constructively introduces a Lyapunov argument into the RCMDP equation (1) without a need to solve for the constrained control of the uncertain system in its entirety.

Thus, for the RCMDP problem given by equation (1), the Lyapunov function 504 can be given as $$L_f(\mathcal{P}, s, \pi) = \hat{\mathcal{D}}(\pi, \mathcal{P}, f(s)) \quad (2)$$
$$= p_0^\top \bar{u}_p^\pi$$
$$= p_0^\top \mathbb{E}[h^\theta(\xi) + f(s)]$$

where $f$ the auxiliary cost function 500. The Lyapunov function (2) is dependent on the auxiliary cost function $f$.

Further, to determine the optimal control policy based on the Lyapunov function (2), the controller 200 computes a set of robust Lyapunov-induced Markov stationary policies 506. The set of robust Lyapunov-induced Markov stationary policies is defined as $$F_{L_f}(s) = \{\pi(\cdot|s), \text{ s.t. } T_{\pi, d_{max}}[L_f](s) \leq L_f(s)\}$$

where $T_{\pi d_{max}}[\bullet]$ is Bellman operator with respect to policy $\pi$ from the set of Markov stationary policies, for a robust cost $d_{max}$, is defined as $$d_{max}, \text{ s.t. } \max_{p \in P} \hat{D}(\pi, \mathcal{P}) = p_0^T \mathbb{E}\left[\sum_{k=0}^\infty \gamma^t d_{max}(s_t, \pi(s_t))\right]$$

and $T_{\pi d_{max}}[\bullet]$ is defined as $$T_{\pi, d_{max}}[L_f] = \Sigma_a \pi(a|s)[d_{max}(s,a) + \Sigma_{s' \in \Xi} P(s'|s,a) L_f(s')]$$

where $\Xi$ is a set of initial states. The Bellman operator satisfies a contraction property, which can be written as $$\max_{p \in P} \hat{D}(s, \pi, \mathcal{P}) = \lim_{k \to \infty} T^k_{\pi, d_{max}}[L_f](s) < L_f(s), \forall s \in \Xi$$

Therefore, $$\max_{p \in P} \hat{D}(\xi_0, \pi, P) \leq L_f(s_0),$$

Subsequently, from the Lyapunov function (2), a feasible solution of the RCMDP problem given by equation (1) can be given as $$\max_{p \in P} \hat{D}(s_0, \pi, :P) \leq L_f(s_0) \leq \max_{p \in P} L_f(P, s_0) \leq d_0 \quad (3)$$

The equation (3) implies that any control policy computed from the set of robust Lyapunov-induced Markov stationary policies $F_{L_f}(s)$ is a robust safe policy for the system to be controlled (e.g., system 100).

Further, the controller 200 determines the optimal control policy 508 within the set of robust Lyapunov-induced Markov stationary policies. In an embodiment, a robust safe policy iteration (RSPI) algorithm is used to determine the optimal control policy 508 within the set of robust Lyapunov-induced Markov stationary policies.

FIG. 5B shows the robust safe policy iteration (RSPI) algorithm for determining the optimal control policy, according to some embodiments.

The RSPI algorithm starts with a feasible, but suboptimal, control policy $\pi_0$. Subsequently, an associated robust Lyapunov function is computed. Next, an associated robust cost function $c_{max}$ is computed, and a corresponding robust cost value function is computed as $$V_{\pi,k} = \max_{p \in P} \hat{C}(\pi_k, P).$$

Further, an intermediate policy is obtained within the set of robust Lyapunov-induced Markov stationary policies. Such a process is repeated until a predefined number of iteration is reached or until the intermediate control policy converges to a steady optimal control policy $\pi^*$.

In an alternate embodiment, a robust safe value iteration (RSVI) algorithm is used to determine the optimal control policy 508 within the set of robust Lyapunov-induced Markov stationary policies.

FIG. 5C shows the robust safe value iteration (RSVI) algorithm for determining the optimal control policy, according to some embodiments.

The RSVI algorithm starts with a feasible, but suboptimal, control policy $\pi_0$. Subsequently, an associated robust Lyapunov function is computed. Next, an associated robust cost function $c_{max}$ is computed, and a corresponding value function $Q_{k+1}$ is computed for the associated robust Lyapunov-induced Markov stationary policies. Further, an intermediate control policy is obtained within the set of robust Lyapunov-induced Markov stationary policies. This process is repeated until the predefined number of iteration is reached or until the control policy converges to the steady optimal control policy $\pi^*$.

Figure 6:
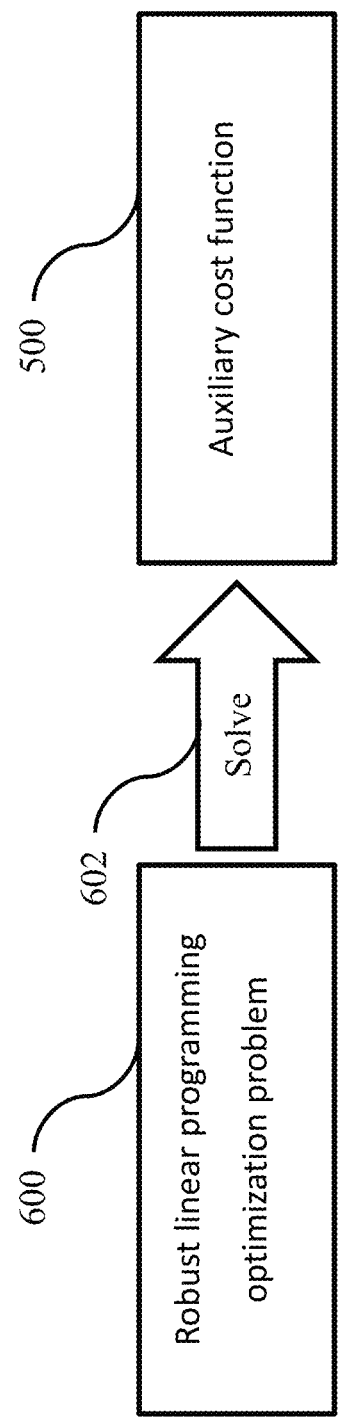
FIG. 6 shows a schematic for determining an auxiliary cost function, according to an embodiment.

FIG. 6 shows a schematic for determining the auxiliary cost function 500, according to an embodiment. A robust linear programming optimization problem 600 is solved 602 by the controller 200 to determine the auxiliary cost function 500. The robust linear programming optimization problem 600 is given by $$\tilde{f} = \mathrm{argmax}_{f}\left(d_0 - \max_{p \in P} L_f(P, s_0) \geq \tilde{\epsilon}\right), \tilde{\epsilon} > 0 \quad (4)$$

The auxiliary cost function 500 is a solution of the robust linear programming optimization problem 600 given by equation (4), where $L_f$ is given by equation (2). The robust linear programming optimization problem 600 maximizes a value of the auxiliary cost function that maintains satisfaction of the safety constraints for all possible states of the system with the uncertainties of the dynamics of the system, to determine the auxiliary cost function 500.

Figure 7:
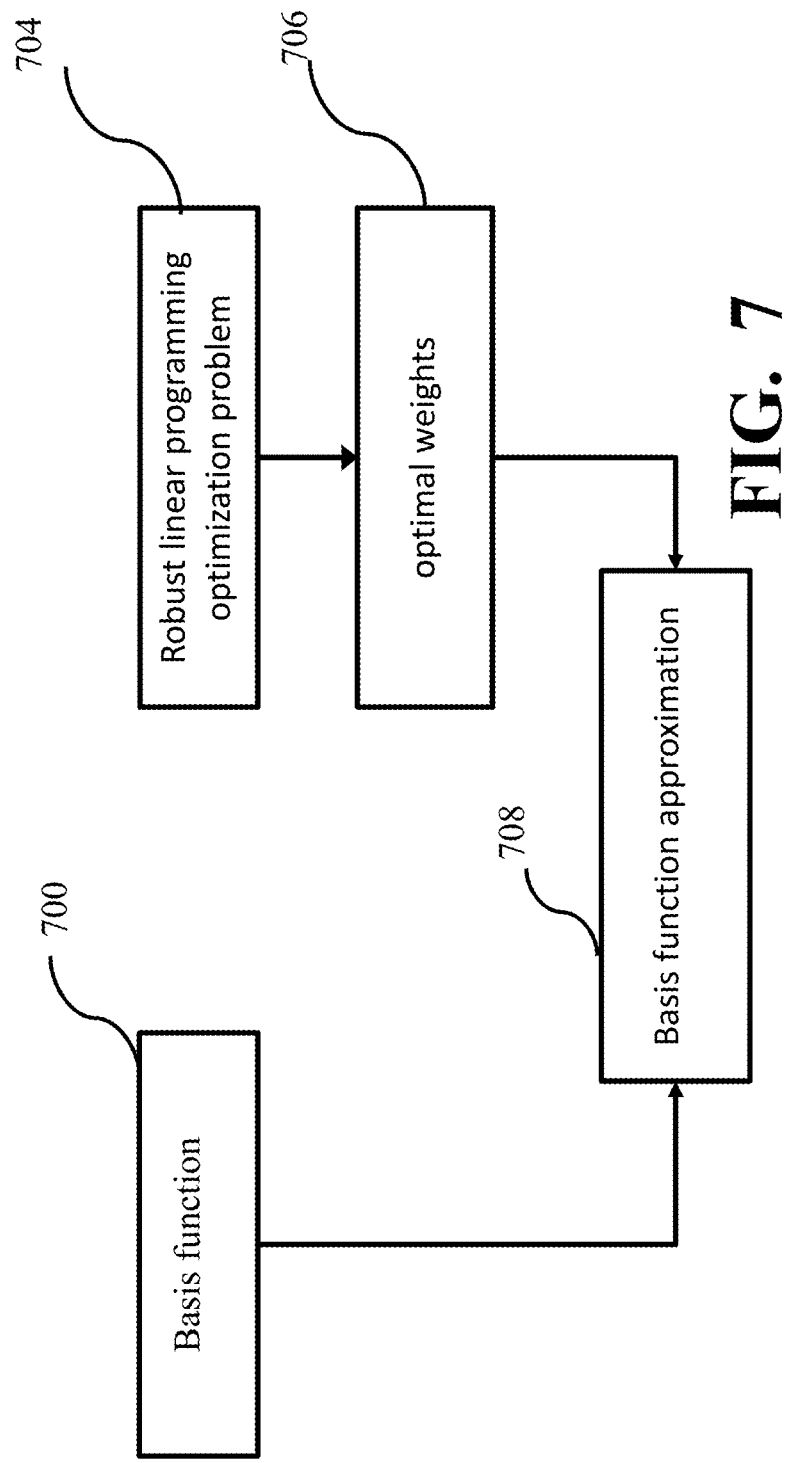
FIG. 7 shows a schematic for determining the auxiliary cost function based on a basis function, according to an embodiment.

FIG. 7 shows a schematic for determining the auxiliary cost function 500 based on a basis function, according to an embodiment. Some embodiments are based on recognition that a combination of a basis function 700 and optimal weights 706 associated with the basis function can be used for determining the auxiliary cost function 500. Specifically, a basis function approximation of $\tilde{f}$ is used to determine the auxiliary cost function 500. The basis function approximation of $\tilde{f}$ is given as $$\tilde{f} = \sum_{i=1}^{i=N} \omega_i^* \phi_i(s) \quad (5)$$

where $\phi_i$ is the basis function 700, and $\omega_i^*$ is an optimal weight associated with the basis function $\phi_i$. The optimal weights 706 are represented as $\omega_i^*$, $i \in \{1, \ldots, N\}$. According to an embodiment, the optimal weights 706 are computed by solving a robust linear programming optimization problem 704 given by $$\omega^* = \mathrm{argmax}_{\omega}\left(d_0 - \max_{p \in \mathcal{P}} L_{\tilde{f}}(\mathcal{P}, s_0) \geq \tilde{\epsilon}\right), \tilde{\epsilon} > 0 \quad (6)$$

Therefore, the auxiliary cost function 500 is a weighted combination of the basis functions with weights determined by the solution of the robust linear programming optimization problem 704.

Alternatively, in other embodiment, the basis function approximation of $\tilde{f}$ can be realized by a deep neural network (DNN) model. The weights of the deep neural network can be determined by the solution of the robust linear programming optimization problem.

The DNN model is used to represent a mapping between the state s and the value of the auxilliary cost function at the state s. The DNN can be any deep neural network, e.g., fully connected network, convolutional network, residual network, and the like. The DNN model is trained by solving for the optimal problem given by equation (6) to obtain optimal coefficients of the DNN model, and thus obtain an approximation for the auxilliary cost function.

Figure 8:
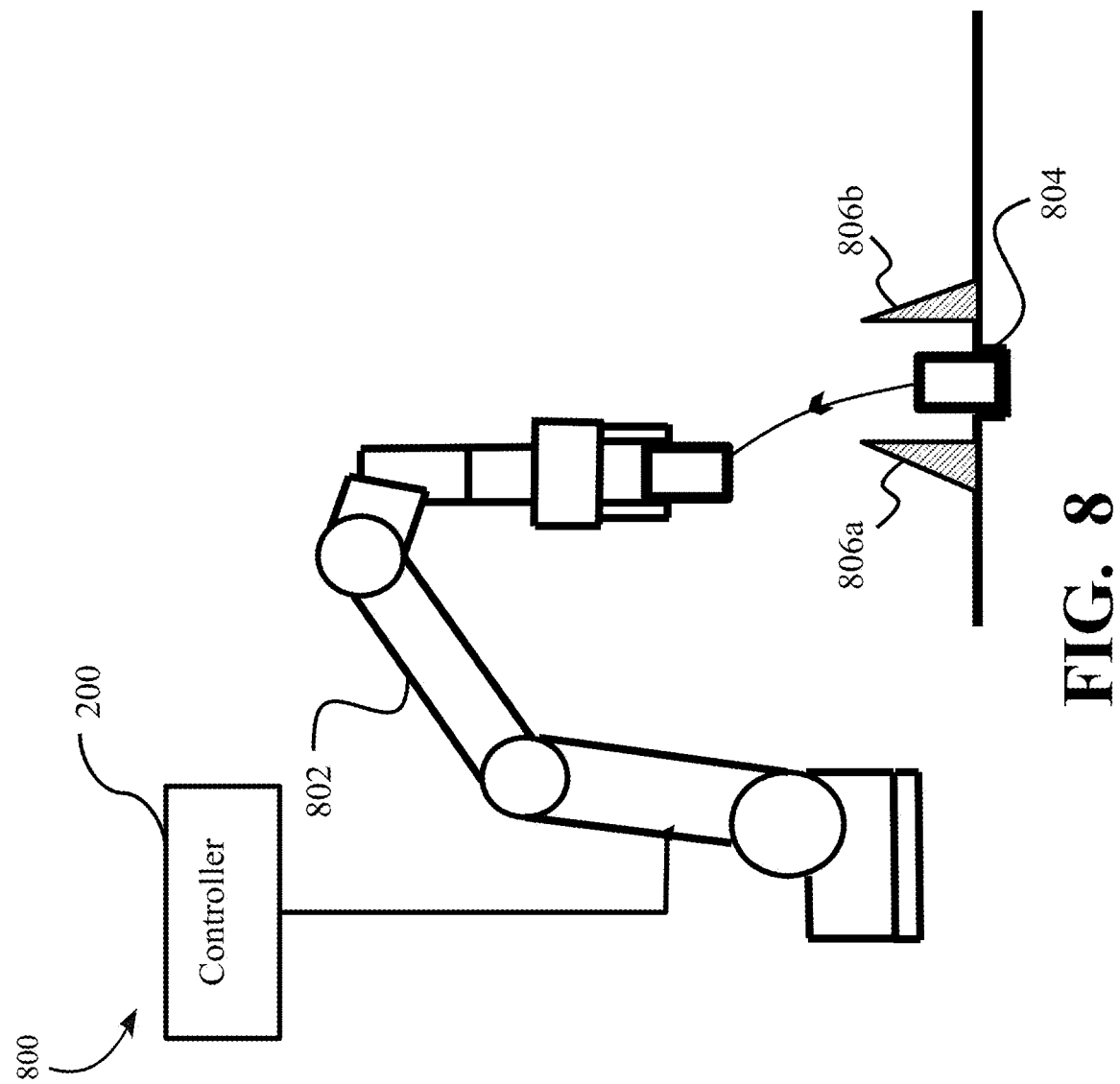
FIG. 8 shows a robot system integrated with the controller for performing an operation, according to some embodiments.

FIG. 8 shows a robot system 800 integrated with the controller 200 for performing an operation, according to some embodiments. A robotic arm 802 is configured to perform the operation including picking of an object 804 of a certain shape, while maneuvering between obstacles 806*a* and 806*b*. Here, the robotic arm 802 is the system to be controlled, task of picking the object 804 is a performance task, and the obstacle avoidance is a safety task. In other words, it an object of some embodiments to control the robot arm 802 (system) to pick up the object 804 (performance task), while avoiding the obstacles 806*a* and 806*b* (safety task). A model of the object 804, or the obstacles 806*a* and 806*b*, or the robotic arm 802 may not be known, since due to aging and faults, the model of the robots can be uncertain (in other words, dynamics of the robot arm 802 is uncertain).

The controller 200 acquires historical data of the operation of the robotic arm 802. The historical data may include pairs of control actions and state transitions of the robotic arm 802 controlled according to corresponding control actions. The robotic arm 802 is in a current state. The controller 200 may determine a current control action or a control policy according to the RCMDP given by equation (1). The RCMDP given by equation (1) uses the historical data to optimize a performance cost of the task of picking the object 804 subject to an optimization of a safety cost enforcing the constraints (obstacle avoidance) on the task of picking the object 804. A state transition for each of state and action pairs in the performance cost and the safety cost is represented by a plurality of state transitions capturing the uncertainties of the dynamics of the robot arm 802.

The controller 200 controls the task of picking the object 804 according to the determined current control action or the control policy to change the state of the system from the current state to the next state. To that end, the controller 200 ensures not to hit the obstacles 806a and 806b while picking up the object 804, regardless of the uncertainty on the object 804, or obstacles 806a and 806b, or the robot arm 802, during operation of the robot system 800.

Figure 9A:
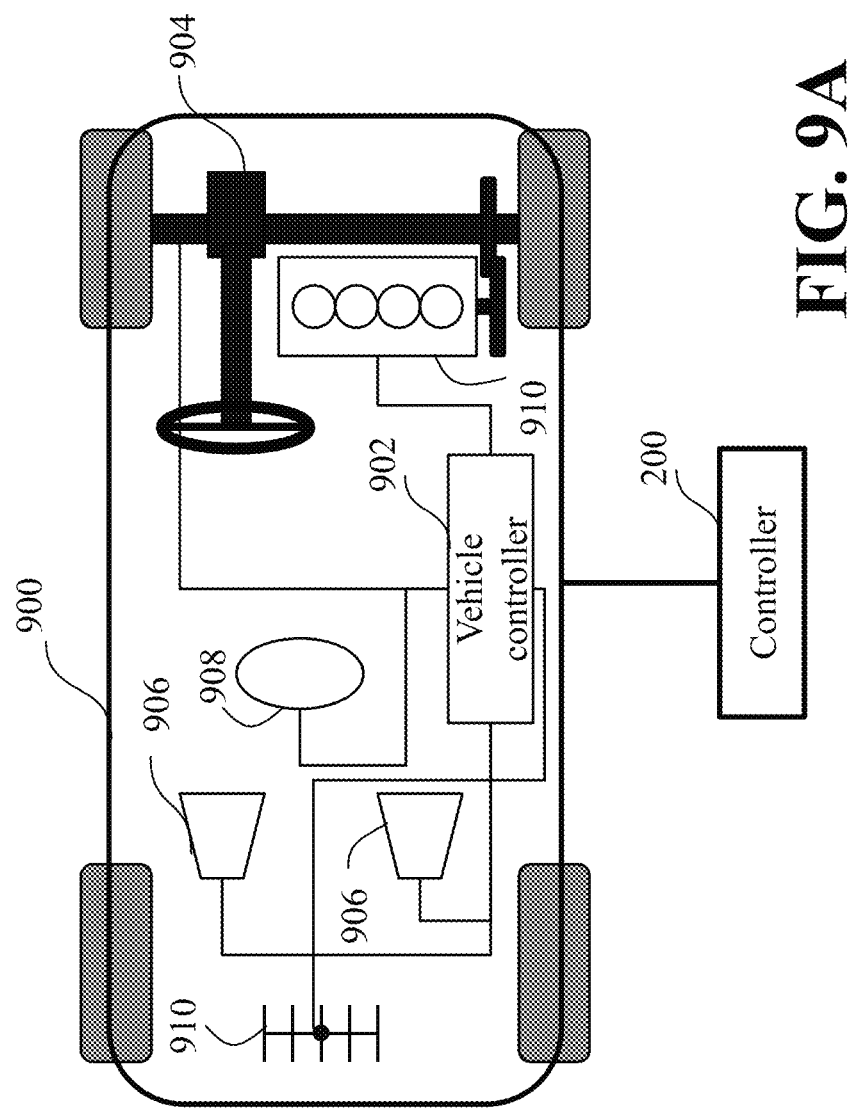
FIG. 9A shows a schematic of a vehicle system including a vehicle controller in communication with the controller employing principles of some embodiments.

FIG. 9A shows a schematic of a vehicle system 900 including a vehicle controller 902 in communication with the controller 200 employing principles of some embodiments. The vehicle 900 may be any type of wheeled vehicle, such as a passenger car, bus, or rover. Also, the vehicle 900 can be an autonomous or semi-autonomous vehicle. For example, some embodiments control motion of the vehicle 900. Examples of the motion include lateral motion of the vehicle controlled by a steering system 904 of the vehicle 900. In one embodiment, the steering system 904 is controlled by the vehicle controller 902. Additionally, or alternatively, the steering system 904 may be controlled by a driver of the vehicle 900.

In some embodiments, the vehicle 900 may include an engine 910, which can be controlled by the vehicle controller 902 or by other components of the vehicle 900. In some embodiments, the vehicle 900 may include an electric motor in place of the engine 910 and can be controlled by the vehicle controller 902 or by other components of the vehicle 900. The vehicle 900 can also include one or more sensors 906 to sense the surrounding environment. Examples of the sensors 906 include distance range finders, such as radars. In some embodiments, the vehicle 900 includes one or more sensors 908 to sense its current motion parameters and internal status. Examples of the one or more sensors 908 include global positioning system (GPS), accelerometers, inertial measurement units, gyroscopes, shaft rotational sensors, torque sensors, deflection sensors, pressure sensor, and flow sensors. The sensors provide information to the vehicle controller 902. The vehicle 900 may be equipped with a transceiver 910 enabling communication capabilities of the vehicle controller 902 through wired or wireless communication channels with the system 200 of some embodiments. For example, through the transceiver 910, the vehicle controller 902 receives control actions from the controller 200.

Figure 9B:
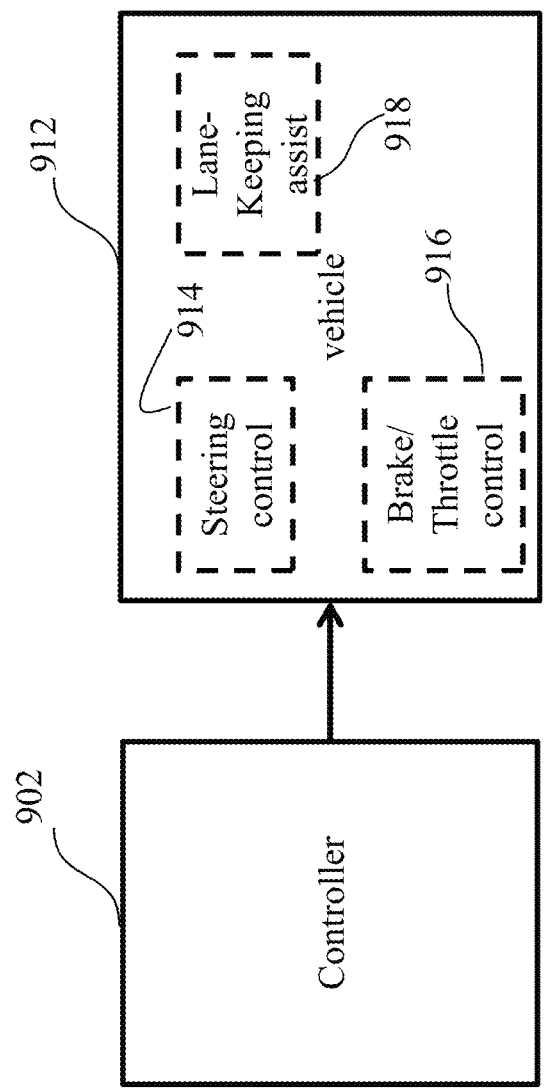
FIG. 9B shows a schematic of interaction between the vehicle controller and other controllers of the vehicle system, according to some embodiments.

FIG. 9B shows a schematic of interaction between the vehicle controller 902 and other controllers 912 of the vehicle 900, according to some embodiments. For example, in some embodiments, the controllers 912 of the vehicle 900 are steering control 914 and brake/throttle controllers 916 that control rotation and acceleration of the vehicle 900. In such a case, the vehicle controller 902 outputs control commands, based on the control actions, to the controllers 914 and 916 to control the kinematic state of the vehicle 900. In some embodiments, the controllers 912 also includes high-level controllers, e.g. a lane-keeping assist controller 918 that further process the control commands of the vehicle controller 902. In both cases, the controllers 912 utilize the output of the vehicle controller 902 i.e. control commands to control at least one actuator of the vehicle 900, such as the steering wheel and/or the brakes of the vehicle 900, in order to control the motion of the vehicle 900.

Figure 9C:
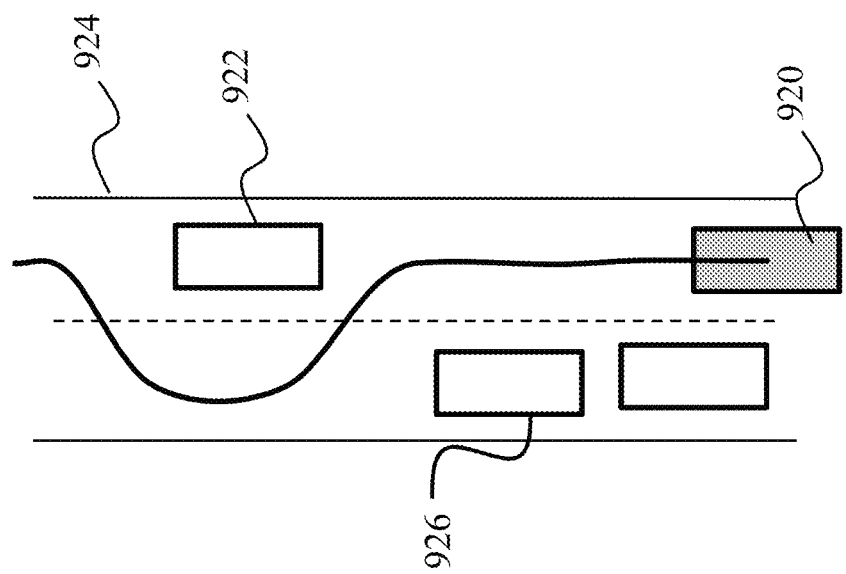
FIG. 9C shows a schematic of an autonomous or semi-autonomous controlled vehicle for which control actions are generated by using some embodiments.

FIG. 9C shows a schematic of an autonomous or semi-autonomous controlled vehicle 920 for which the control actions are generated by using some embodiments. The controlled vehicle 920 may be equipped with the controller 200. The controller 200 controls the controlled vehicle 920 to keep the controlled vehicle 920 within particular bounds of road 924, and aims to avoid other uncontrolled vehicles, i.e., obstacles 922 for the controlled vehicle 920. For such controlling, the controller 200 determines the control actions according to the RCMDP. In some embodiments, the control actions include commands specifying values of one or combination of a steering angle of wheels of the controlled vehicle 920, a rotational velocity of the wheels, and an acceleration of the controlled vehicle 920. Based on the control actions, the controlled vehicle 920 may, for example, pass another vehicle on the left 926 or on the right side, without hitting the vehicle 926 and the vehicle 922 (obstacles).

Additionally, the RCMDP given by equation (1) can be used in policy transfer from simulation to real world (Sim2Real). Since, in real applications, to mitigate sample inefficiency of model-free reinforcement learning (RL) algorithms, training often occurs on a simulated environment. The result is then transferred to the real world, typically followed by fine-tuning, a process referred to as Sim2Real. The utilization of RCMDP (equation (1)) for policy transfer from simulation to real world (Sim2Real) in safety critical applications may yield benefit from performance and safety guarantees which are robust with respect to a model uncertainty.

Figure 10:
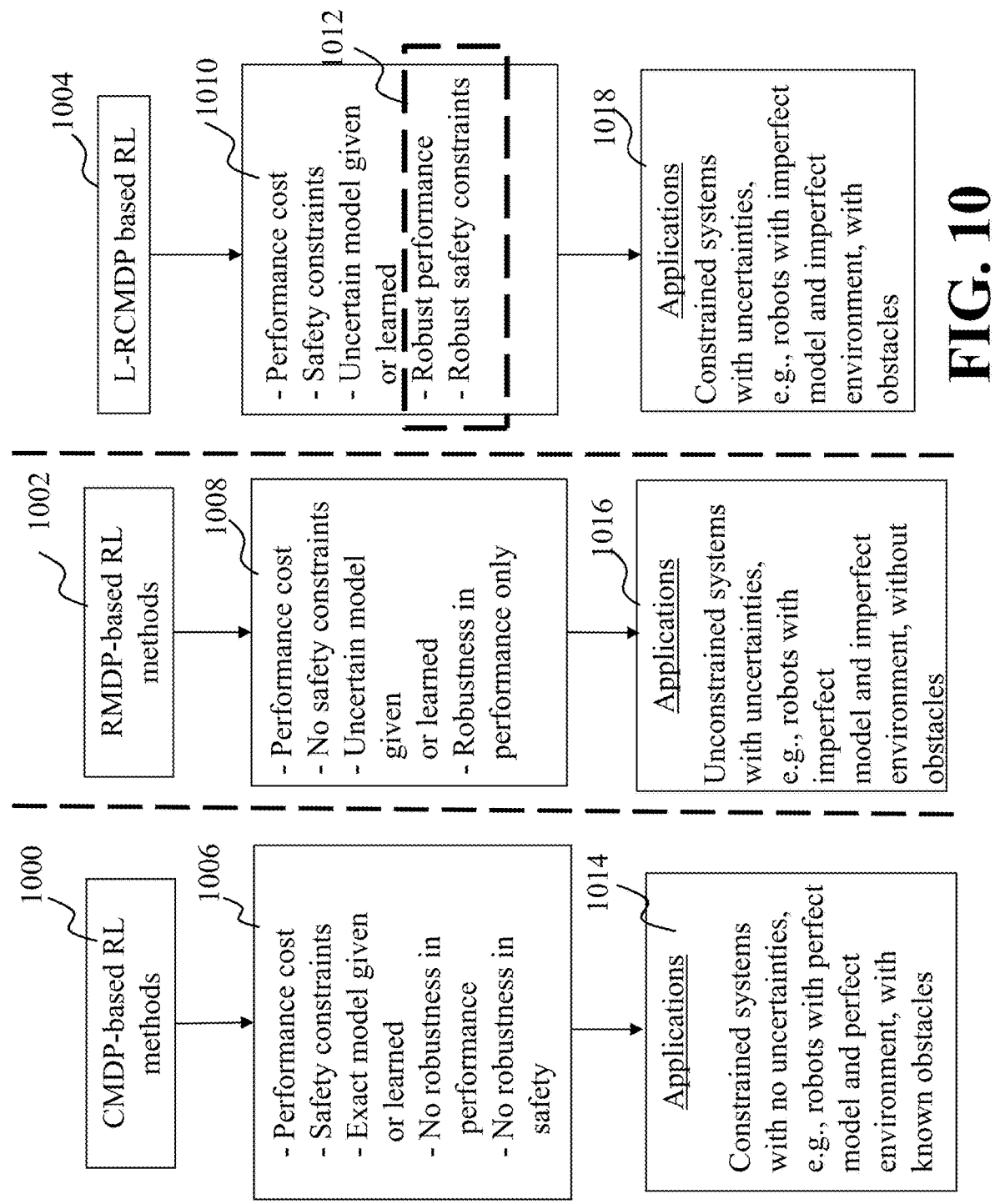
FIG. 10 shows a schematic of characteristics of CMDP-based reinforcement learning (RL) methods, RMDP-based RL methods, and Lyapunov-based robust constrained MDP (L-RCMDP) based RL.

FIG. 10 shows a schematic of characteristics of CMDP-based RL 1000 methods, RMDP-based RL 1002 methods, and Lyapunov-based robust constrained MDP (L-RCMDP) based RL 1004. A list of characteristics exhibited by the CMDP-based RL methods 1000 is shown in block 1006. The characteristics of the CMDP-based RL methods 1000 include, for example, performance cost, safety constraints, exact model given or learned. However, the CMDP-based RL methods 1000 exhibits no robustness in performance, no robustness in safety. A list of characteristics of the RMDP-based RL methods 1002 is shown in block 1008. The characteristics of the RMDP-based RL methods 1002 include, for example, performance cost, no safety constraints, uncertain model given or learned, and robustness in the performance.

A list of characteristics exhibited by the L-RCMDP based RL 1004 is shown in block 1010. The L-RCMDP based RL 1004 may correspond to the RCMDP problem given by equation (1). The characteristics of the L-RCMDP based RL 1004 include, for example, performance cost, safety constraints, uncertain model given or learned, robust performance, robust safety constraints. It can be noted, from the L-RCMDP based RL characteristics 1010 in view of the characteristics of the CMDP-based RL 1000 methods and the RMDP-based RL 1002 methods, that the L-RCMDP based RL characteristics 1010 exhibits advantageous properties 1012, i.e, the robust performance and the robust safety constraints. Due to such advantageous properties 1012, the L-RCMDP based RL 1004 may seek and guarantee robustness of both the performance and the safety constraints.

The characteristics of each type of RL method define what type of application is suitable for each type of RL method. For instance, the CMDP-based RL methods 1000 can be applied to constrained systems with no uncertainties 1014, for example, robots with perfect model and perfect environment with known obstacles. The RMDP-based RL methods 1002 can be applied to unconstrained systems with uncertainties 1016, for example, robots with imperfect model and imperfect environment, without obstacles. The L-RCMDP based RL 1004 can be applied to constrained systems with the uncertainties 1018, for example, robots with imperfect model and imperfect environment, with obstacles.

Figure 11:
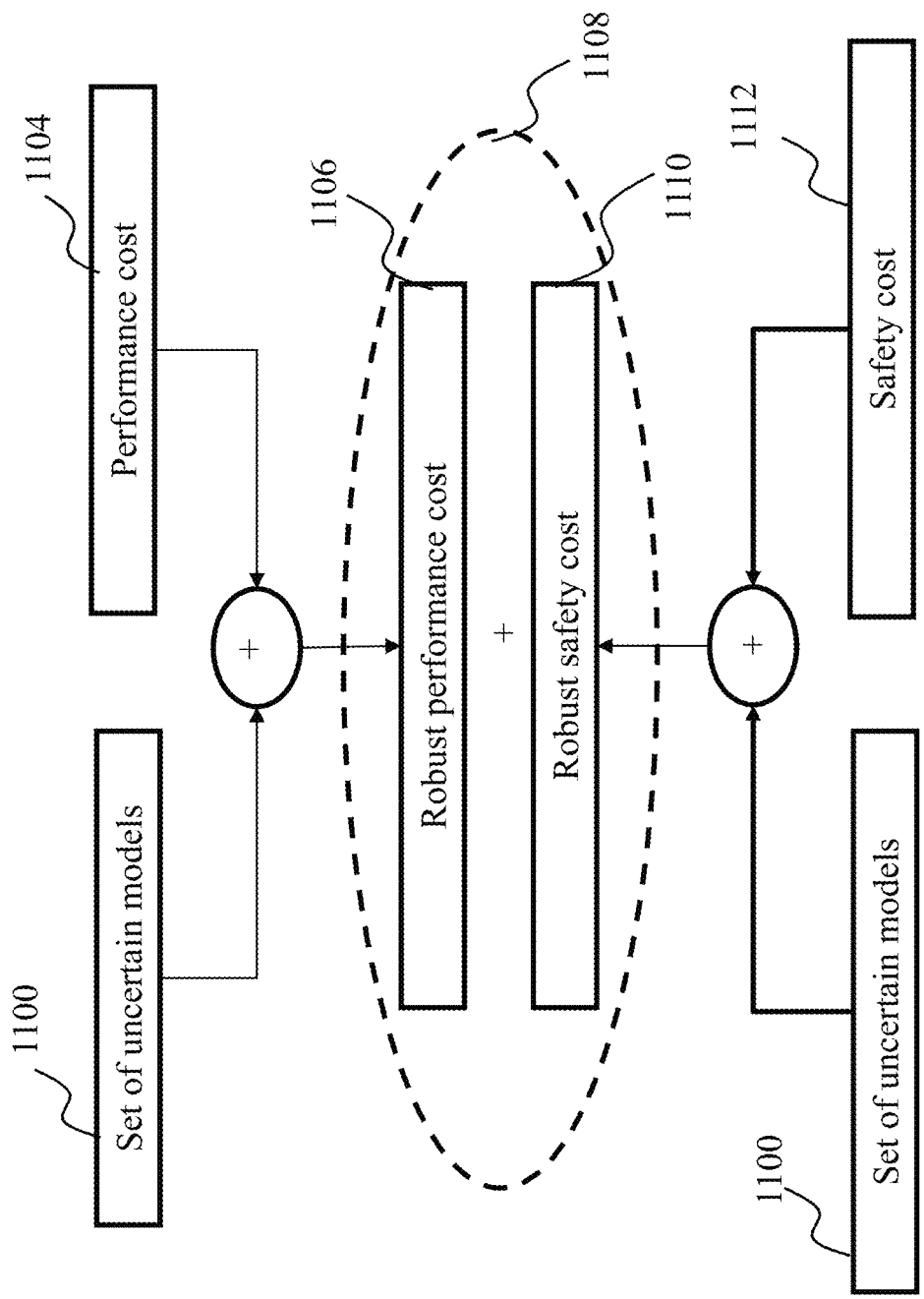
FIG. 11 shows a schematic of an overview of RCMDP formulation, according to some embodiments.

FIG. 11 shows a schematic of an overview of the RCMDP formulation, according to some embodiments. A performance cost 1104 in combination with a set of uncertain models 1100 forms a robust performance cost 1106. Specifically, the set of uncertain models 1100 is incorporated in the performance cost 1104 to produce the robust performance cost 1106. Further, a safety cost 1112 in combination with the same set of uncertain models 1100 forms a robust safety cost 1110. In particular, the set of uncertain models 1100 is incorporated in the safety cost 1112 to produce the robust safety cost 1110. The robust performance cost 1106 together with the robust safety cost 1110 constitutes a RCMDP 1108. The formulation of the RCMDP is explained in detail above with reference to FIGS. 1A, 1B, 1C, and 3. Further, the formulated RCMDP 1108 may be solved. Solving the RCMDP 1108 may refer to optimization of the performance cost 1104 over the set of uncertain models 1100, subject to an optimization of the safety cost 1112 over the set of uncertain models 1100.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a system having uncertainties in its dynamics subject to constraints on an operation of the system, comprising: at least one processor; and memory having instructions stored thereon that, when executed by the at least one processor, cause the controller to:
    acquire historical data of the operation of the system including pairs of control actions and state transitions of the system controlled according to corresponding control actions;
    determine, for the system in a current state, a current control action transitioning a state of the system from the current state to a next state, wherein the current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system; and
    control the operation of the system according to the current control action to change the state of the system from the current state to the next state.

2. The controller of claim 1, wherein the optimization of the performance cost is a minimax optimization that optimizes the performance cost for worst-case scenario of values of uncertain parameters causing the uncertainties of the dynamics of the system.

3. The controller of claim 1, wherein the optimization of the safety cost optimizes an optimization variable subject to a hard constraint.

4. The controller of claim 1, wherein the performance cost and the safety cost are optimized using a Lyapunov decent.

5. The controller of claim 1, wherein the safety cost is annotated with an auxiliary cost function configured to enforce that the constraints are satisfied at the current state while reducing Lyapunov function along the dynamics of the system over subsequent evolution of the state transitions evolution.

6. The controller of claim 5, wherein the auxiliary cost function is a solution of a robust linear programming optimization problem that maximizes a value of the auxiliary cost function that maintains satisfaction of the safety constraints for all possible states of the system with the uncertainties of the dynamics.

7. The controller of claim 6, wherein the auxiliary cost function is a weighted combination of basis functions with weights determined by the solution of the robust linear programming optimization problem.

8. The controller of claim 7, wherein the auxiliary cost function is a weighted combination of basis functions defining a neural network with weights of the neural network determined by the solution of the robust linear programming optimization problem.

9. A method for controlling a system having uncertainties in its dynamics subject to constraints on an operation of the system, the method comprising:
acquiring historical data of the operation of the system including pairs of control actions and state transitions of the system controlled according to corresponding control actions;
determining, for the system in a current state, a current control action transitioning a state of the system from the current state to a next state, wherein the current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system; and
controlling the operation of the system according to the current control action to change the state of the system from the current state to the next state.

10. The method of claim 9, wherein the optimization of the performance cost is a minimax optimization that optimizes the performance cost for worst-case scenario of values of uncertain parameters causing the uncertainties of the dynamics of the system.

11. The method of claim 9, wherein the optimization of the safety cost optimizes an optimization variable subject to a hard constraint.

12. The method of claim 9, wherein the performance cost and the safety cost are optimized using a Lyapunov decent.

13. The method of claim 9, wherein the safety cost is annotated with an auxiliary cost function configured to enforce that the constraints are satisfied at the current state while reducing Lyapunov function along the dynamics of the system over subsequent evolution of the state transitions evolution.

14. The method of claim 13, wherein the auxiliary cost function is a solution of a robust linear programming optimization problem that maximizes a value of the auxiliary cost function that maintains satisfaction of the safety constraints for all possible states of the system with the uncertainties of the dynamics.

15. The method of claim 14, wherein the auxiliary cost function is a weighted combination of basis functions with weights determined by the solution of the robust linear programming optimization problem.

16. The method of claim 15, wherein the auxiliary cost function is a weighted combination of basis functions defining a neural network with weights of the neural network determined by the solution of the robust linear programming optimization problem.

17. A non-transitory computer readable medium having stored thereon computer executable instructions which when executed by a computer cause the computer to perform a method for controlling a system having uncertainties in its dynamics subject to constraints on an operation of the system, the method comprising:
acquiring historical data of the operation of the system including pairs of control actions and state transitions of the system controlled according to corresponding control actions;
determining, for the system in a current state, a current control action transitioning a state of the system from the current state to a next state, wherein the current control action is determined according to a robust and constraint Markov decision process (RCMDP) that uses the historical data to optimize a performance cost of the operation of the system subject to an optimization of a safety cost enforcing the constraints on the operation, wherein a state transition for each of state and action pairs in the performance cost and the safety cost is represented by a plurality of state transitions capturing the uncertainties of the dynamics of the system; and
controlling the operation of the system according to the current control action to change the state of the system from the current state to the next state.

18. The non-transitory computer readable medium of claim 17, wherein the optimization of the performance cost is a minimax optimization that optimizes the performance cost for worst-case scenario of values of uncertain parameters causing the uncertainties of the dynamics of the system.

19. The non-transitory computer readable medium of claim 17, wherein the optimization of the safety cost optimizes an optimization variable subject to a hard constraint.

20. The non-transitory computer readable medium of claim 17, wherein the performance cost and the safety cost are optimized using a Lyapunov decent.

* * * * *